United States Patent
Nakajima

(10) Patent No.: US 9,350,981 B2
(45) Date of Patent: May 24, 2016

(54) IMAGE DISPLAY SYSTEM, SHUTTER GLASSES, AND DISPLAY APPARATUS

(75) Inventor: Yasuhisa Nakajima, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 13/388,754

(22) PCT Filed: Jun. 1, 2011

(86) PCT No.: PCT/JP2011/062622
§ 371 (c)(1),
(2), (4) Date: Mar. 19, 2012

(87) PCT Pub. No.: WO2011/158653
PCT Pub. Date: Dec. 22, 2011

(65) Prior Publication Data
US 2013/0076878 A1  Mar. 28, 2013

(30) Foreign Application Priority Data
Jun. 18, 2010  (JP) ................. 2010-139104

(51) Int. Cl.
H04N 13/04  (2006.01)
H04N 9/47   (2006.01)
(Continued)

(52) U.S. Cl.
CPC ......... H04N 13/0425 (2013.01); G09G 3/003 (2013.01); H04N 13/0422 (2013.01); H04N 13/0438 (2013.01); H04N 13/0497 (2013.01); G09G 2320/0242 (2013.01); G09G 2320/0693 (2013.01); H04N 2213/008 (2013.01)

(58) Field of Classification Search
USPC .................................................. 348/42–60
See application file for complete search history.

(56) References Cited

U.S. PATENT DOCUMENTS 4,949,726 A * 8/1990 Hartzell et al. ............... 600/544
6,188,442 B1 * 2/2001 Narayanaswami ........... 348/564
(Continued)

FOREIGN PATENT DOCUMENTS

CN  102196285 A  9/2011
JP  08111876 A   4/1996
(Continued)

OTHER PUBLICATIONS

Office Action from Chinese Application No. 2011-80003904.4, dated Feb. 8, 2014.
(Continued)

Primary Examiner — Hung Dang
(74) Attorney, Agent, or Firm — Hazuki International, LLC

(57) ABSTRACT

To adaptively perform display control by a display apparatus in accordance with characteristics of shutter glasses, the state of a viewer wearing the shutter glasses, etc.
Glasses information, such as the chromaticity point, the luminance, and the opening response time when a shutter is opened, which is dependent on the material of a liquid crystal used for the shutter, is sent from shutter glasses 13 to a display apparatus. A display apparatus 11 receives glasses information from the shutter glasses 13 worn by a viewer, and performs image correction, such as chromaticity point correction and luminance adjustment, and opening/closing control timing control, on each of a left-eye image and a right-eye image. It is possible to provide three-dimensional images with correct colors, suitable luminance, and small crosstalk without being dependent on the viewer's subjectivity.

21 Claims, 13 Drawing Sheets

(51) Int. Cl.
*H04N 9/80* (2006.01)
*H04N 5/76* (2006.01)
*G09G 3/00* (2006.01)

(56) References Cited

U.S. PATENT DOCUMENTS

| | | | |
|---|---|---|---|
| 2002/0128541 A1* | 9/2002 | Kim et al. | 600/301 |
| 2009/0096863 A1* | 4/2009 | Kim et al. | 348/42 |
| 2010/0085424 A1 | 4/2010 | Kane et al. | |
| 2011/0025821 A1* | 2/2011 | Curtis et al. | 348/43 |
| 2011/0050865 A1* | 3/2011 | Seong et al. | 348/53 |
| 2011/0221874 A1* | 9/2011 | Oh | 348/51 |
| 2011/0248911 A1* | 10/2011 | Si | H04N 13/0418 345/156 |

FOREIGN PATENT DOCUMENTS

| | | |
|---|---|---|
| JP | 8289327 | 11/1996 |
| JP | 9018894 | 1/1997 |
| JP | 9023451 | 1/1997 |
| JP | 09138384 A | 5/1997 |
| JP | 09252478 A | 9/1997 |
| JP | 11075223 A | 3/1999 |
| JP | 2000036969 A | 2/2000 |
| JP | 2003045343 A | 2/2003 |
| JP | 2009275117 A | 11/2009 |
| JP | 2009276948 A | 11/2009 |
| JP | 2010029282 A | 2/2010 |
| JP | 2010116206 A | 5/2010 |

OTHER PUBLICATIONS

Office Action from Japanese Application No. 2010-139104, dated Feb. 4, 2014.
International Search Report, PCT/JP2011/062622, dated Aug. 9, 2011.
Supplementary European Search Report from EP Application No. 11795561, dated Aug. 7, 2014.

* cited by examiner

IMAGE DISPLAY SYSTEM, SHUTTER GLASSES, AND DISPLAY APPARATUS

CROSS-REFERENCE TO RELATED APPLICATION

The present application is a national phase entry under 35 U.S.C. §371 of International Application No. PCT/JP2011/062622 filed Jun. 1, 2011, published on Dec. 22, 2011 as WO 2011/158653 A1, which claims priority from Japanese Patent Application No. JP 2010-139104 filed in the Japanese Patent Office on Jun. 18, 2010.

TECHNICAL FIELD

The present invention relates to an image display system that is constituted of a combination of a display apparatus for displaying a plurality of different images in a time division manner and shutter glasses worn by a viewer of images and that presents three-dimensional images to a viewer by opening and closing right and left shutters of the shutter glasses in synchronization with the switching of images of the display apparatus, and to shutter glasses and a display apparatus. More particularly, the invention relates to an image display system in which the display apparatus adaptively performs display control in accordance with characteristics of the shutter glasses, the state of a viewer wearing the shutter glasses, etc., and to shutter glasses and a display apparatus.

BACKGROUND ART

By displaying images having parallax between left and right eyes, three-dimensional images that allow viewers to perceive three-dimensionally can be presented. One of the measures to present three-dimensional images is that a viewer wears glasses having special optical characteristics and images having parallax between left and right eyes are presented.

For example, a time-division three-dimensional image display system is constituted of a combination of a display apparatus for displaying a plurality of different images in a time division manner and shutter glasses worn by a viewer. The display apparatus alternately displays a left-eye image and a right-eye image on a screen in a very short period of cycle. The shutter glasses worn by a viewer include a shutter mechanism made of a liquid crystal lens, etc. in each of a left-eye section and a right-eye section. In the shutter glasses, while a left-eye image is being displayed, the left-eye section of the shutter glasses transmits light and the right-eye section blocks light. Also, while a right-eye image is being displayed, the right-eye section of the shutter glasses transmits light and the left-eye section blocks light (for example, see PTLs 1 to 3). That is, the display apparatus displays a left-eye image and a right-eye image in a time division manner, and, in synchronization with the switching of images to be displayed by the display apparatus, the shutter glasses select an image by using the shutter mechanisms, thereby presenting three-dimensional images to a viewer.

The present inventors consider that it is preferable that, in an image display system constituted of a combination of shutter glasses and a display apparatus, the display apparatus adaptively performs display control in accordance with characteristics of shutter glasses, the state of a viewer wearing the shutter glasses, etc.

For example, it is known that, depending on the material of a liquid crystal used for the left and right shutters, even when a shutter is opened, it does not completely transmit light, and the chromaticity point slightly deviates. If a display apparatus and shutter glasses have a one-on-one correspondence, for example, if shutter glasses attached to the display apparatus are used, the display apparatus corrects a slightly deviating chromaticity point so that the color can be corrected after the shutter glasses have transmitted light. However, if shutter glasses made of an undesirable liquid crystal material are used, for example, if a display apparatus and shutter glasses which were made by different manufacturers are combined, the correction of a chromaticity point by the display apparatus is not sufficient to correct the color after the shutter glasses have transmitted light. Also, if two or more pairs of shutter glasses made of different liquid crystal materials are used at the same time, viewers have to view images with different colors since the chromaticity points of the shutter glasses are different.

One of the measures to solve such problems is to correct a chromaticity point to an optimal value by a display apparatus. However, such a correction has to be performed through the adjustment by a user, which is a nuisance. Additionally, the adjustment depends on the user's subjectivity, and the color is not necessarily adjusted to a correct color.

The transmittance, as well as the chromaticity, is also different among liquid crystal materials, and thus, the transmittance when the shutter is opened is different among pairs of shutter glasses. Accordingly, even for the same image, if it is viewed with different pairs of shutter glasses, the luminance may be too bright and such an image may not be suitable to be viewed. In this case, too, the user has to adjust the luminance, which is a nuisance, and also, the luminance is not necessarily adjusted to an optimal value.

Additionally, the response time for a shutter operation, as well as the chromaticity and the transmittance, is also different among liquid crystal materials, and the time necessary from when a shutter opening control signal is received until a shutter operation finishes is different among individual pairs of shutter glasses. Accordingly, even for the same image, if it is viewed with different pairs of shutter glasses, a suitable shutter opening/closing timing range is different among the individual pairs of shutter glasses to be viewed. Then, if the shutter opening/closing control is not performed at a suitable timing, crosstalk may occur, and such an image may not be suitable to be viewed. In this case, too, the user has to adjust the timing, which is a nuisance, and also, the timing is not necessarily adjusted to an optimal timing.

CITATION LIST

Patent Literature

PTL 1: Japanese Unexamined Patent Application Publication No. 9-138384
PTL 2: Japanese Unexamined Patent Application Publication No. 2000-36969
PTL 3: Japanese Unexamined Patent Application Publication No. 2003-45343

SUMMARY OF INVENTION

Technical Problem

An object of the present invention is to provide an excellent image display system, shutter glasses, display apparatus in which the display apparatus adaptively performs display control in accordance with characteristics of the shutter glasses, the state of a viewer wearing the shutter glasses, etc.

Solution to Problem

The present application has been made on the basis of the above-described problem, and certain embodiments provide an image display system including: shutter glasses including shutter lenses, a storage section storing therein at least glasses information, and a communication section; and a display apparatus including a display section that displays images and a communication section, wherein: the shutter glasses perform an operation for opening and closing the shutter lenses in synchronization with switching of images of the display section of the display apparatus, and also send the glasses information to the display apparatus via the communication section; and the display apparatus controls the display section on the basis of the received glasses information.

It is noted that, the "system" described here refers to a logical set of a plurality of apparatuses (or functional modules that implement specific functions), regardless of whether the individual apparatuses or functional modules are provided within a single casing.

According to certain embodiments of the present application, the image display system is configured as follows. The shutter glasses may store, as the glasses information, information concerning characteristics of the shutter lenses in the storage section, and may also send the information to the display apparatus via the communication section, and in response to this, the display apparatus may perform image correction for a display image signal of the display section on the basis of the information concerning the characteristics of the shutter lenses received as the glasses information.

According to certain embodiments of the present application, the image display system is configured as follows. The shutter glasses may store, as the glasses information, information concerning a chromaticity point of the shutter lenses in the storage section, and may also send the information to the display apparatus via the communication section, and in response to this, the display apparatus may perform chromaticity correction for a display image signal of the display section on the basis of the information concerning the chromaticity received as the glasses information.

According to certain embodiments of the present application, the image display system is configured as follows. When receiving, as the glasses information, information concerning the chromaticity point from each of a plurality of pairs of shutter glasses, the display apparatus may perform chromaticity correction for a display image signal of the display section on the basis of an average value of the chromaticity points of the individual pairs of shutter glasses.

According to certain embodiments of the present application, the image display system is configured as follows. The shutter glasses may store, as the glasses information, information concerning a transmittance of the shutter lenses in the storage section, and may also send the information to the display apparatus via the communication section, and in response to this, the display apparatus may adjust a luminance for a display image signal of the display section on the basis of the information concerning the transmittance received as the glasses information.

According to certain embodiments of the present application, the image display system is configured as follows. When receiving, as the glasses information, information concerning the transmittance from each of a plurality of pairs of shutter glasses, the display apparatus may reduce the luminance for a display image signal of the display section on the basis of the highest transmittance.

According to certain embodiments of the present application, the image display system is configured as follows. The shutter glasses may store, as the glasses information, information concerning an opening response time of the shutter lenses in the storage section, and may also send the information to the display apparatus via the communication section, and in response to this, the display apparatus may perform timing correction for an opening control signal for the shutter lenses generated by an image signal processing circuit of the display apparatus, on the basis of the information concerning the opening response time received as the glasses information.

According to certain embodiments of the present application, the image display system is configured as follows. When receiving, as the glasses information, information concerning the opening response time from each of a plurality of pairs of shutter glasses, the display apparatus may perform timing correction for the opening control signal for the shutter lenses generated by the display section, on the basis of an average value of the opening response times of the individual pairs of shutter glasses.

According to certain embodiments of the present application, the image display system is configured as follows. When receiving the glasses information from a plurality of pairs of shutter glasses, the display apparatus may perform image correction for each of continuous frames in accordance with the glasses information of the corresponding pair of shutter glasses, and also causes the corresponding pair of shutter glasses to control opening and closing of the shutter lenses in accordance with a display period of a frame assigned to the corresponding pair of shutter glasses.

According to certain embodiments of the present application, the image display system is configured as follows. The shutter glasses may send, as the glasses information, biological information concerning a viewer wearing the shutter glasses to the display apparatus via the communication section, and in response to this, the display apparatus may display a display content suitable for the received biological information on the display section.

Moreover, certain embodiments of the present application provide shutter glasses including: shutter lenses; a shutter drive section that causes the shutter lenses to perform an opening/closing operation; a communication section that performs bi-directional communication with a display apparatus that switches images in a time division manner; and a storage section that stores therein at least glasses information, wherein the shutter glasses perform control, on the basis of an opening control signal received from the display apparatus by the communication section, so that the shutter drive section causes the shutter lenses to perform an opening/closing operation, and also read the glasses information from the storage section and send the glasses information to the display apparatus via the communication section.

According to certain embodiments of the present application, the storage section of the shutter glasses may store a chromaticity point, a transmittance, or an opening response time of the shutter lenses, or the other glasses information unique to the shutter glasses. Then, the shutter glasses may read the glasses information from the storage section and may send the glasses information to the display apparatus via the communication section.

According to certain embodiments of the present application, the shutter glasses may further include a sensor section that detects biological information concerning a viewer wearing the shutter glasses. Then, the shutter glasses may send the glasses information based on the biological information detected by the sensor section to the display apparatus via the communication section.

According to certain embodiments of the present application, the sensor section of the shutter glasses may be configured to detect a brain wave signal of the viewer as the biological information. Then, the shutter glasses may send the glasses information concerning the brain wave signal detected by the sensor section or concerning a fatigue degree of the viewer determined from the brain wave signal to the display apparatus via the communication section.

Moreover, certain embodiments of the present application provide a display apparatus including: a display section that displays images; an image signal processing section that processes an image signal displayed on the display section; and a communication section that performs bi-directional communication with shutter glasses worn by a viewer viewing the images displayed on the display section, wherein the display apparatus sends, via the communication section, an opening control signal for allowing the shutter glasses to cause shutter lenses to perform an opening/closing operation in synchronization with switching of the images on the display section, and also controls the display section on the basis of glasses information received from the shutter glasses by the communication section.

According to certain embodiments of the present application, the display apparatus is configured as follows. The display apparatus may receive glasses information concerning characteristics of the shutter lenses from the shutter glasses, and may perform image correction for a display image signal of the display section on the basis of the information concerning the characteristics of the shutter lenses.

According to certain embodiments of the present application, the display apparatus is configured as follows. The display apparatus may receive glasses information concerning a chromaticity point of the shutter lenses from the shutter glasses, and may perform chromaticity correction for the display image signal of the display section on the basis of the information concerning the chromaticity point.

According to certain embodiments of the present application, the display apparatus is configured as follows. When receiving glasses information concerning the chromaticity point of the shutter lenses from each of a plurality of pairs of shutter glasses, the display apparatus may perform chromaticity correction for the display image signal of the display section on the basis of an average value of the chromaticity points of the individual pairs of shutter glasses.

According to certain embodiments of the present application, the display apparatus is configured as follows. The display apparatus may receive glasses information concerning a transmittance of the shutter lenses from the shutter glasses, and may adjust a luminance for the display image signal of the display section on the basis of the information concerning the transmittance.

According to certain embodiments of the present application, the display apparatus is configured as follows. When receiving glasses information concerning the chromaticity point of the shutter lenses from each of a plurality of pairs of shutter glasses, the display apparatus may reduce the luminance for the display image signal of the display section on the basis of the highest transmittance.

According to certain embodiments of the present application, the display apparatus is configured as follows. The display apparatus may receive glasses information concerning an opening response time of the shutter lenses from the shutter glasses, and may perform timing correction for an opening control signal for the shutter lenses on the basis of the information concerning the opening response time.

According to certain embodiments of the present application, the display apparatus is configured as follows. When receiving glasses information concerning the opening response time of the shutter lenses from each of a plurality of pairs of shutter glasses, the display apparatus may perform timing correction for the opening control signal for the shutter lenses on the basis of an average value of the opening response times of the individual pairs of shutter glasses.

According to certain embodiments of the present application, the display apparatus is configured as follows. When receiving the glasses information from a plurality of pairs of shutter glasses, the display apparatus may perform image correction for each of continuous frames in accordance with the glasses information of the corresponding pair of shutter glasses, and may also send, via the communication section, an opening control signal, for the corresponding pair of shutter glasses, for controlling opening and closing of the shutter lenses in accordance with a display period of a frame assigned to the corresponding pair of shutter glasses.

According to certain embodiments of the present application, the display apparatus is configured as follows. The display apparatus may receive from the shutter glasses, as the glasses information, biological information concerning a viewer wearing the shutter glasses, and may display a display content suitable for the received biological information on the display section.

According to certain embodiments of the present application, the display apparatus is configured as follows. The display apparatus may receive from the shutter glasses the glasses information concerning a brain wave signal of a viewer wearing the shutter glasses or concerning a fatigue degree of the viewer determined from the brain wave signal, and may display a warning on the display section in accordance with the fatigue degree of the viewer based on the received glasses information.

According to the present invention, it is possible to provide an excellent image display system, shutter glasses, and display apparatus in which the display apparatus adaptively performs display control in accordance with characteristics of the shutter glasses, the state of a viewer wearing the shutter glasses, etc.

According to certain embodiments of the present application, by the use of a bi-directional transmission channel, such as a wireless network, between the shutter glasses and the display apparatus, the display apparatus can perform control of opening and closing of the shutters of the shutter glasses. Also, glasses information unique to the shutter glasses, such as the chromaticity point and the transmittance of the shutter lenses, and the opening response time, can be sent from the shutter glasses to the display apparatus. Accordingly, this enables the display apparatus to automatically perform chromaticity correction and luminance adjustment which are optimal for the chromaticity point and the transmittance, respectively, of the shutter glasses.

Further, according to certain embodiments of the present application, when simultaneously viewing the single display apparatus with a plurality of pairs of shutter glasses, by the use of the corrected chromaticity value, the reduced luminance value, and the opening response time response value obtained through approximate calculation, the chromaticity difference and the luminance difference among the individual pairs of shutter glasses and crosstalk between left and right images can be minimized.

Further, according to certain embodiments of the present application, when simultaneously viewing the single display apparatus with a plurality of pairs of shutter glasses, if the display apparatus can perform fast frame display by the same number of pairs of shutter glasses, it performs, for each of continuous frames, chromaticity correction for a corresponding pair of shutter glasses, thereby making it possible to display images for which the chromaticity has been corrected optimally for each pair of shutter glasses.

Further, according to certain embodiments of the present application, by the use of a bi-directional transmission channel, such as a wireless network, between the shutter glasses and the display apparatus, the display apparatus can perform control of opening and closing of the shutters of the shutter glasses, and also, the shutter glasses can send biological information concerning a brain wave signal of a viewer wearing the shutter glasses to the display apparatus. Accordingly, this enables the display apparatus to detect whether or not the eyes or brain of the viewer are tired on the basis of the brain wave signal, and to automatically start processing according to the fatigue, by means of, for example, displaying a warning, at a time when the viewer is actually tired.

Other objects, features, and advantages of the present invention will become apparent from a more detailed description based on embodiments of the present invention described later and the accompanying drawings.

DESCRIPTION OF EMBODIMENTS

An embodiment of the present invention will be described in detail below with reference to the drawings.

Figure 1A:
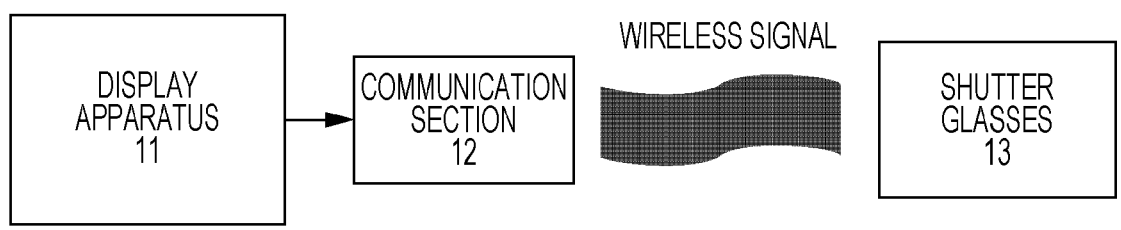
FIG. 1A is a view schematically illustrating an example of the configuration of an image display system.
Figure 1B:
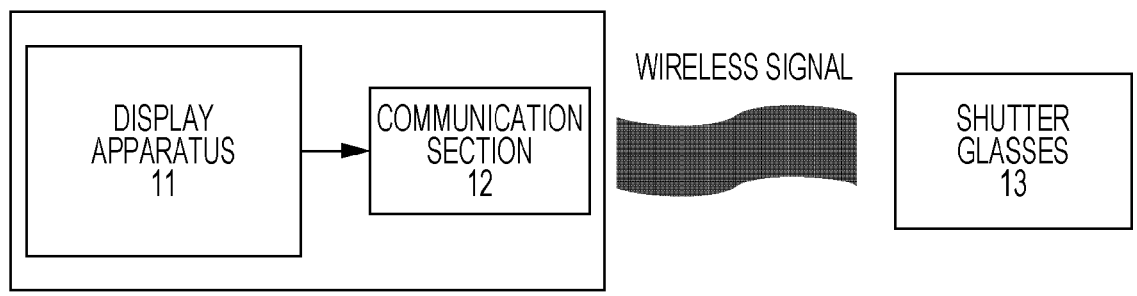
FIG. 1B is a view schematically illustrating an example of the configuration of an image display system.

FIG. 1 schematically illustrates an example of the configuration of an image display system. The image display system is constituted of a combination of a 3D-display (three-dimensional) display apparatus 11 and shutter glasses 13 including a shutter mechanism in each of a left-eye section and a right-eye section. In the example shown in FIG. 1A, wireless signals are sent and received between the shutter glasses 13 and a communication section 12 which is connected to the display apparatus 11 via an external terminal. In the example shown in FIG. 1B, wireless signals are sent and received between the shutter glasses 13 and the communication section 12 integrated in the body of the display apparatus 11.

As communication means between a display apparatus and shutter glasses, infrared communication is often employed. In this embodiment, however, a wireless network implemented by radio communication, such as IEEE802.15.4, is employed. In the examples of the system configurations shown in FIG. 1, the display apparatus 11 and the shutter glasses 13 perform communication on the basis of a one-on-one correspondence. However, the communication section 12 of the display apparatus 11 may operate as an access point and a plurality of pairs of shutter glasses that operate as terminal stations may be contained. The wireless network is based on bi-directional communication, and data communication can also be performed from the shutter glasses 13 to the display apparatus 11, thereby enabling the expansion of services provided by the system. For example, the shutter glasses 13 send glasses information and the display apparatus 11 performs display control or another type of processing on the basis of the received glasses information. Details of the glasses information and an operation of the display apparatus 11 based on the glasses information will be given later. The image display system utilizing a wireless network is disclosed in, for example, Japanese Patent Application No. 2009-276948, which has already been assigned to the present applicant.

The display apparatus used for performing three-dimensional display is not restricted to a specific format. For example, in addition to a conventional CRT (Cathode Ray Tube) display, a plasma display panel (PDP), a liquid crystal display (LCD), and an electroluminescence (EL) panel may be used. Among the above-described display formats, as a liquid crystal display, an active matrix display in which a TFT (Thin File Transistor) is disposed for each pixel is typically used. In a TFT liquid crystal display, an image signal is written into each scanning line from the top to the bottom of a screen so as to drive each pixel, and each pixel blocks or transmits illumination light from a backlight, thereby performing display.

Figure 2:
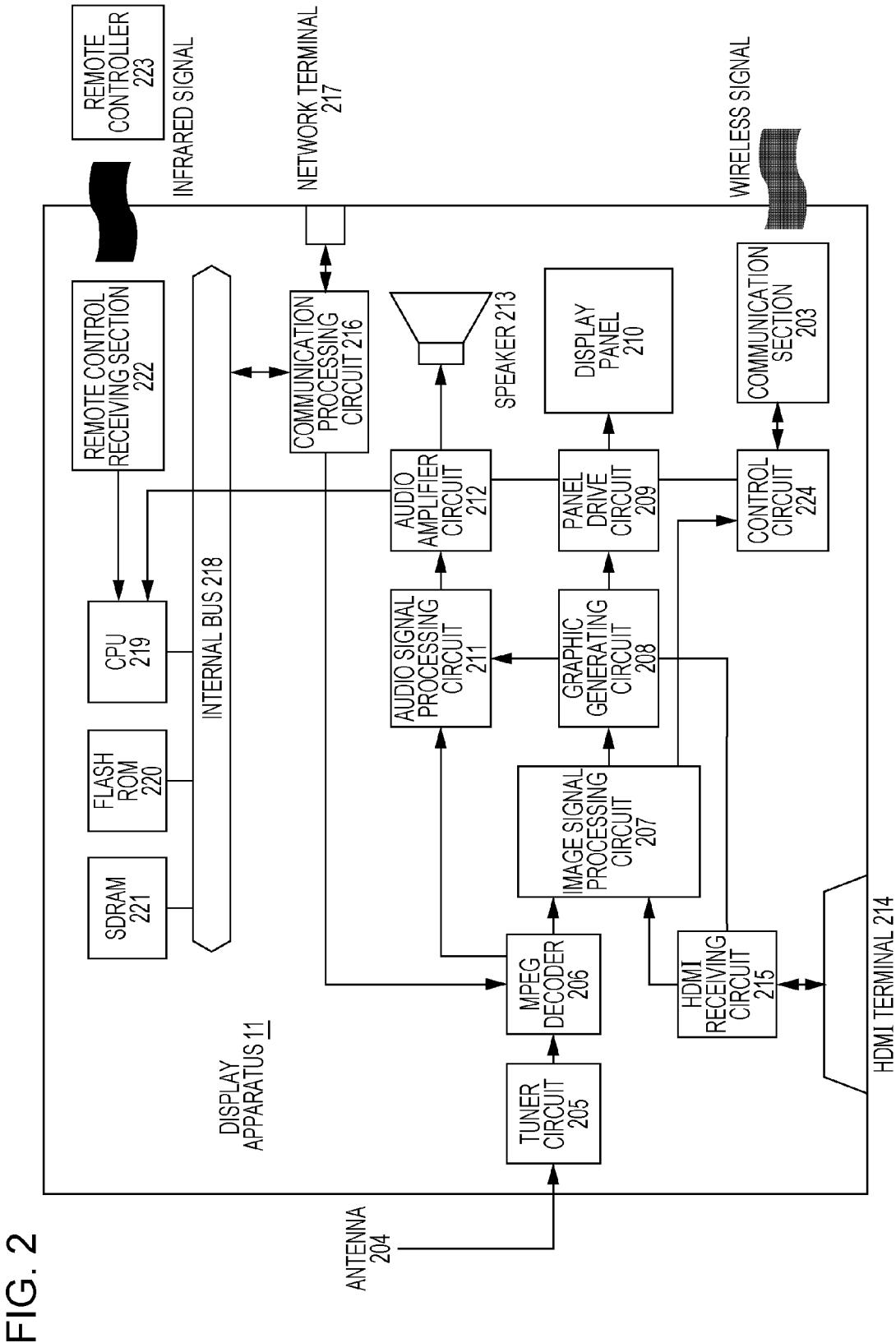
FIG. 2 is a diagram illustrating an example of the internal configuration of a display apparatus 11.

FIG. 2 illustrates an example of the internal configuration of the display apparatus 11. Note that, in the same drawing, the communication section of the wireless network is integrated in the body of the display apparatus (see FIG. 1B). The individual elements will be described below.

Broadcasting waves for broadcasting a three-dimensional program can be received by an antenna 204. Upon inputting broadcasting waves from the antenna 204, a tuner circuit 205 selects a desired stream. An MPEG decoder 206 extracts an image signal and an audio signal from the stream selected by the tuner circuit 205.

The image signal is input into an image signal processing circuit 207 and is subjected to necessary signal processing. Then, if necessary, on-screen display information generated in a graphic generating circuit 208 is superposed on the image signal. The image signal is then output and displayed on a display panel 210 by a panel drive circuit 209. Signal processing performed by the image signal processing circuit 207 includes image correction processing (discussed later), for example, chromaticity correction and luminance reduction. Meanwhile, the audio signal is input into an audio signal processing circuit 211 and is subjected to necessary signal processing. Then, the audio signal is amplified to a desired audio level in an audio amplifying circuit 212 so as to drive a speaker 213.

Three-dimensional content may be obtained from a path other than broadcasting waves. For example, it may be input from an external source device (not shown) connected to a HDMI (High-Definition Multimedia Interface) terminal 214, which is a digital interface, or three-dimensional content distribution may be received via the Internet.

An HDMI receiving circuit 215 allocates input signals from an external source device connected to the HDMI terminal 214 to the image signal processing circuit 207 and the audio signal processing circuit 211. A reception signal from a network terminal 217 is input into the MPEG decoder 206 via a communication processing circuit 216, such as an Ethernet (registered trademark) interface. The MPEG decoder 206 extracts an image signal and an audio signal from the reception signal.

The image signal is input into the image signal processing circuit 207 and is subjected to necessary signal processing. Then, if necessary, on-screen display information generated in the graphic generating circuit 208 is superposed on the image signal. The image signal is then output and displayed on the display panel 210 by the panel drive circuit 209 (the same as above). Meanwhile, the audio signal is input into the audio signal processing circuit 211 and is subjected to necessary signal processing. Then, the audio signal is amplified to a desired audio level in the audio amplifying circuit 212 so as to drive a speaker 213 (the same as above).

While processing image signals, the image signal processing circuit 207 also generates a frame switching signal which is necessary for controlling the opening and closing of the shutters of the shutter glasses and inputs the frame switching signal into a control circuit 224. In accordance with the timing of the input frame switching signal, the control circuit 224 generates an opening control signal that instructs timings at which the left and right shutters of the shutter glasses are opened and closed. The opening control signal is wirelessly transmitted from a communication section 203 to the shutter glasses through radio communication. Moreover, wireless communication between the display apparatus 11 and the shutter glasses is bi-directional, and the communication section 203 receives glasses information which is wirelessly transmitted from the shutter glasses through radio communication.

A control code which is infrared-transmitted from a user by remote-controlling the display apparatus 11 by using a remote controller 223 is received by a remote control receiving section 222. In the example shown in FIG. 2, remote control is performed by using an infrared communication system. However, the communication section 203 may also be used for performing a remote control operation.

In order to control the entirety of the display apparatus 11, circuit components, such as a CPU 219, a flash ROM 220, and an SDRAM 221, are provided. The control code received by the remote control receiving section 222 (or communication section 203) is transferred to the CPU 219 via an internal bus 218. The CPU 219 deciphers the control code and controls the operation of the display apparatus 11. Meanwhile, glasses information received by the communication section 203 is input into the CPU 219 via the control circuit 224. The CPU 219 stores glasses information, together with computed information, in the flash ROM 220.

Figure 3:
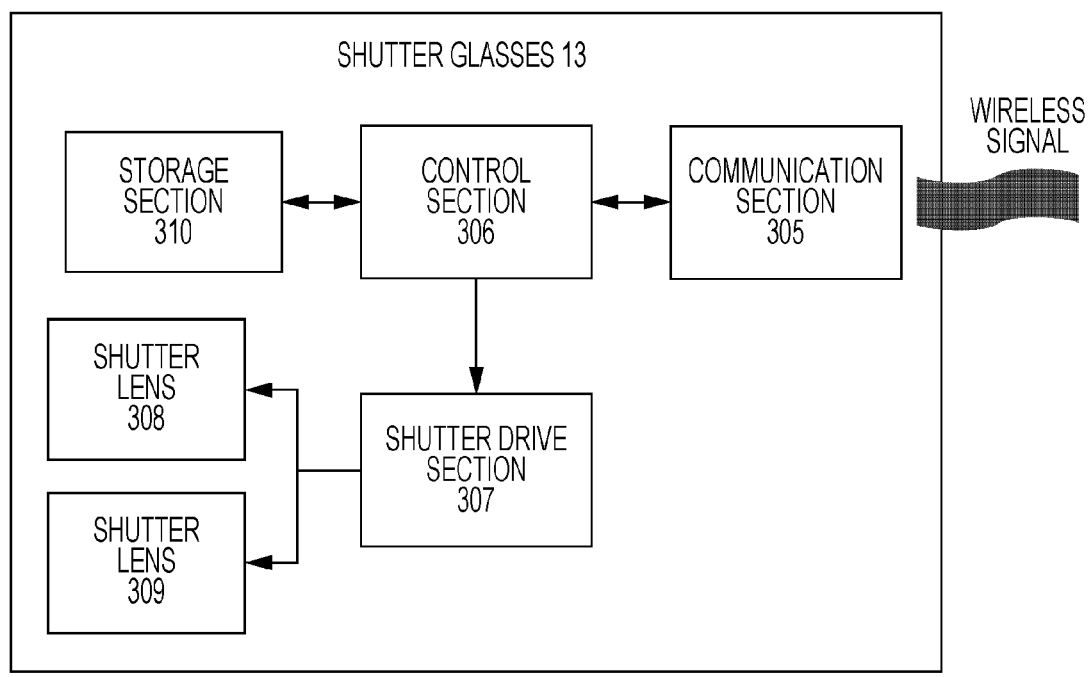
FIG. 3 is a diagram illustrating an example of the internal configuration of shutter glasses 13.

FIG. 3 illustrates an example of the internal configuration of the shutter glasses 13. The shutter glasses 13 include a communication section 305 that sends and receives wireless signals to and from the display apparatus 11 through radio communication, a control section 306, a storage section 310 that stores therein glasses information and other data, a left-eye shutter 308 and a right-eye shutter 309 which are each made of a liquid crystal material, and a shutter drive circuit 307.

A wireless signal sent from the display apparatus 11 to the shutter glasses 13 is, for example, an opening control signal that instructs timings at which the left and right shutters of the shutter glasses 13 are opened and closed. Upon receiving the opening control signal, the communication section 305 inputs it into the control section 306. The control section 306 deciphers the opening control signal so as to determine timings at which the left and right shutter lenses 308 and 309 are opened and closed. The control section 306 controls, on the basis of the determination result, the opening and closing operations of the left and right shutter lenses 308 and 309 via the shutter drive circuit 307. The control section 306 inputs and outputs data into and from the storage section 310.

The glasses information sent from the shutter glasses 13 to the display apparatus 11 through a wireless signal includes the chromaticity point, the luminance, the shutter opening response time, etc., when the shutters are opened, which are dependent on the liquid crystal material used for the left-eye shutter lens 308 and the right-eye shutter lens 309. When the power of the shutter glasses 13 is turned ON, for example, the control section 306 reads glasses information from the storage section 310, and wirelessly sends the glasses information to the display apparatus 11 via the communication section 305. Upon receiving this glasses information from the shutter glasses 13 which are worn by a viewer viewing three-dimensional images, the display apparatus 11 performs, on each of the left-eye image and the right-eye image, image correction, such as chromaticity point correction and luminance adjustment, and adjustment of the shutter opening response control timings. With this operation, the image display system is able to present three-dimensional images with correct colors, suitable luminance, and minimum crosstalk without being dependent on the viewer's subjectivity.

Figure 4A:
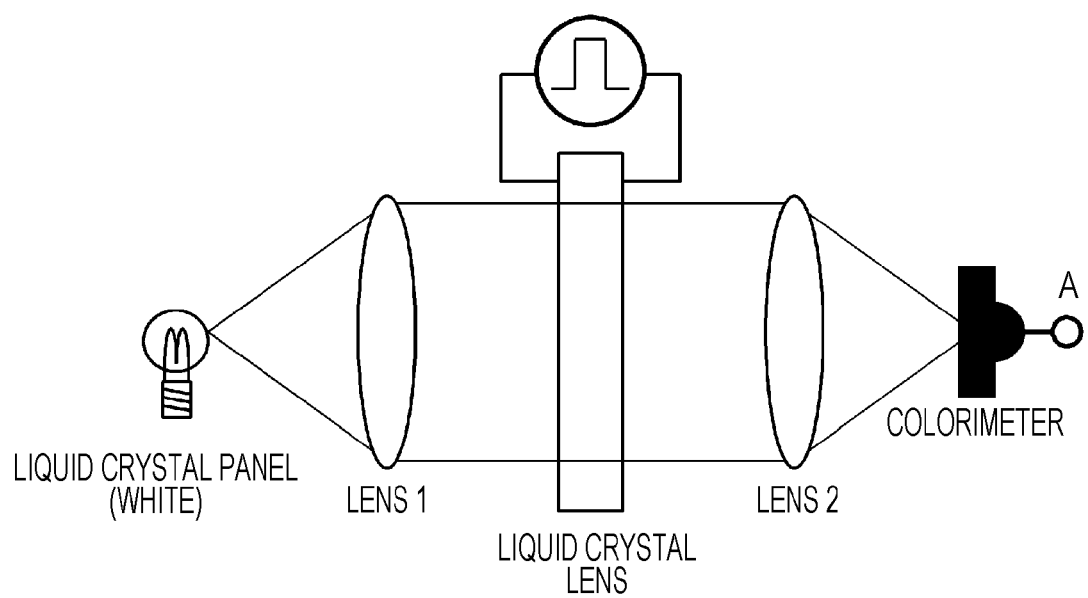
FIG. 4A is a view schematically illustrating an example of a measurement method for information concerning chromaticity points of liquid crystal shutters.
Figure 4A:
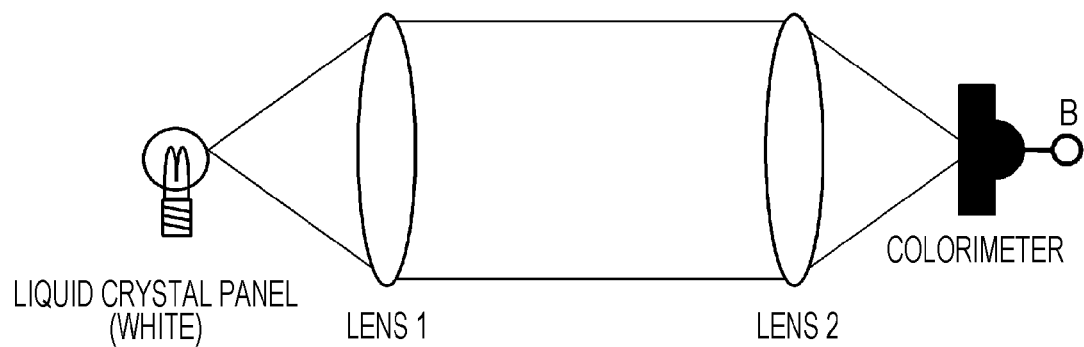

FIG. 4A schematically illustrates an example of a measurement method for information concerning the chromaticity point of a liquid crystal shutter, as glasses information. In the same drawing, a chromaticity point has been obtained as a result of allowing light from a light source having a reference chromaticity point to pass through a liquid crystal lens and to input into a colorimeter while the shutter is opened, and also a chromaticity point has been obtained as a result of inputting light from the same light source into the colorimeter while the shutter is opened without passing through a liquid crystal lens. Comparative data representing those chromaticity points is obtained (see FIG. 4B). Note that, although the chromaticity is expressed by XY axes in FIG. 4B, it may be expressed by UV axes.

Figure 5:
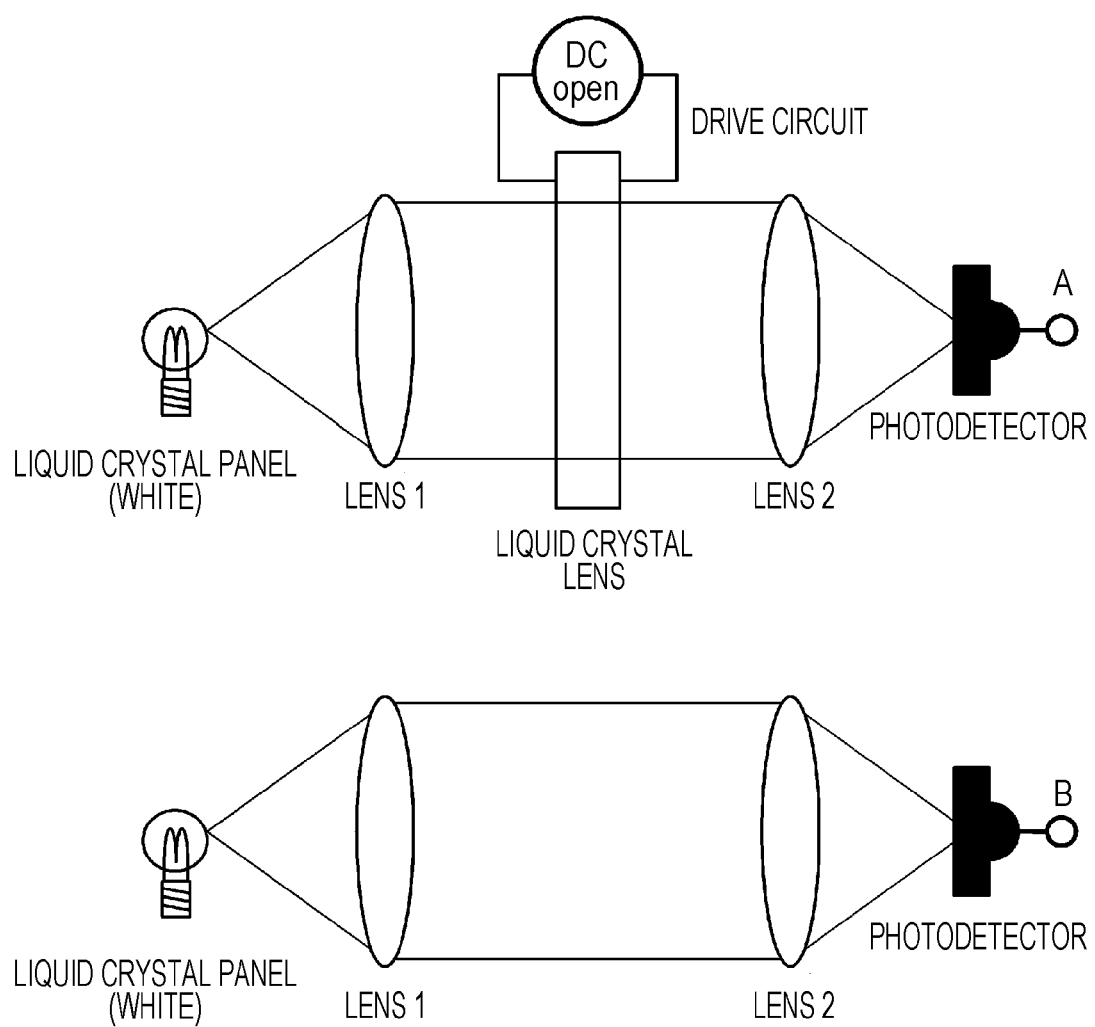
FIG. 5 is a view schematically illustrating an example of a measurement method for information concerning the transmittance of liquid crystal shutters.

FIG. 5 schematically illustrates an example of a measurement method for information concerning the transmittance of a liquid crystal shutter, as glasses information. In the same drawing, chromaticity point A has been obtained as a result of allowing light from a light source having a reference chromaticity point to pass through a liquid crystal lens and to input into a photodetector while the shutter is opened, and luminance B has been obtained as a result of inputting light from the same light source into the photodetector while the shutter is opened without passing through a liquid crystal lens. Comparative data (A/B) representing those chromaticity points is obtained.

Figure 13:
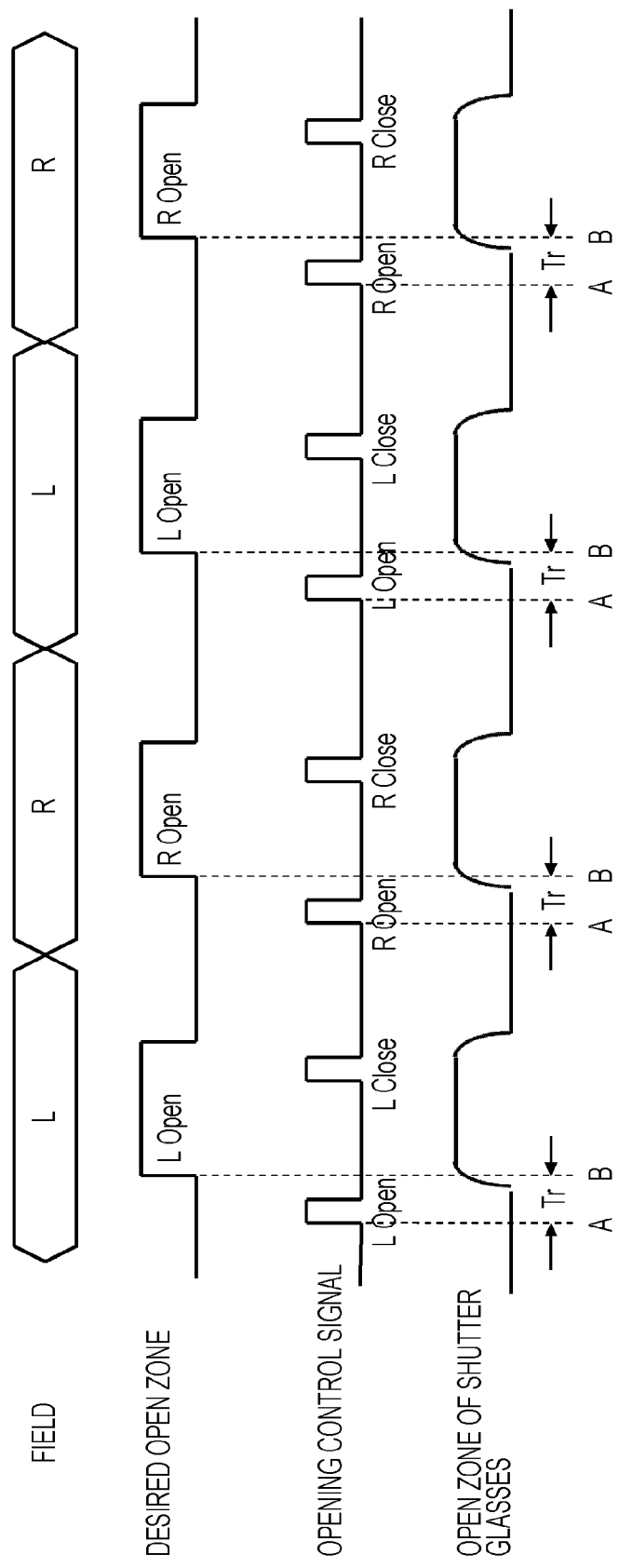
FIG. 13 is a diagram schematically illustrating an example of a measurement method for an opening response time of a liquid crystal shutter, as glasses information.

Moreover, FIG. 13 schematically illustrates an example of a measurement method for information concerning the opening response time of a liquid crystal shutter, as glasses information. In the same drawing, a time difference (B−A) from when an opening control signal, which serves as a reference, is input until when the liquid crystal shutter is rotated by 90 degrees is obtained.

The glasses information obtained as described above is stored in advance in the storage section 310 within the shutter glasses 11. Then, when the power of the shutter glasses 11 is ON or when a request is made from the display apparatus 11 via a wireless signal, the control section 306 reads glasses information from the storage section 310 and wirelessly transmits the glasses information to the display apparatus 11 via the communication section 305.

Table 1 indicates an example of addressing of glasses information in the storage area within the storage section 310. Three bytes are assigned, as a storage area for the glasses information, to the addresses of the storage area of the storage section 310. In the following two bytes, information concerning the chromaticity point (White Balance) is stored. Then, in the following one byte, information concerning the transmittance is stored. In the final one byte, information concerning the opening response time is stored.

TABLE 1

| Memory Address | Data Description |
|---|---|
| — | Other Information |
| N | White Balance (Chromaticity Point) |
| N + 2 | Transmittance |
| N + 3 | Response Time (Opening Response Time) |
| N + 4 | Other Information |
| — | Other Information |

Figure 4B:
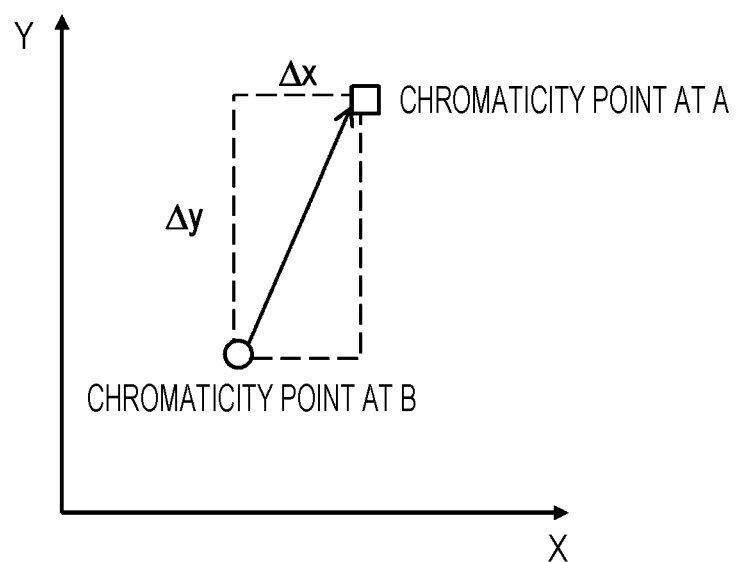
FIG. 4B is a view (chromaticity diagram) illustrating comparative data of the chromaticity points obtained by the measurement method shown in FIG. 4A.

Table 2 indicates an example of representation of the chromaticity point using two bytes. As shown in FIG. 4B, the chromaticity point information is represented by relative values (Δx, Δy) with respect to a reference chromaticity point. Accordingly, one byte is assigned to each of the X axis and the Y axis: the first one bit of one byte is assigned to sign information, and the color difference Δx or Δy on the X axis or Y axis is represented by the remaining seven bits.

TABLE 2

| Bit | Function |
|---|---|
| 0 | Axis X data Sign (0:plus, 1:minus) |
| 1-7 | Axis ΔX |
| 8 | Axis Y data Sign (0:plus, 1:minus) |
| 9-15 | Axis ΔY |

Additionally, Table 3 indicates an example of representation of the transmittance using one byte. The transmittance is also represented by a relative value (A/B), and is represented by using one byte in the form of the percentage (A/B×100). Although data having numbers after decimal points is not represented in the same table, such data may be represented by making extensions, such as by increasing the number of bytes, if necessary.

TABLE 3

| Bit | Function |
|---|---|
| 0-7 | Loss ratio (0-64%) |

Additionally, Table 4 indicates an example of representation of the opening response time using one byte. The opening response time is represented by an absolute value (B−A), and is represented by using one byte in the form of milliseconds (B−A)×10. Although data having numbers of the second and subsequent decimal places is not represented in the same table, such data may be represented by making extensions, such as by increasing the number of bytes, if necessary.

TABLE 4

| Bit | Function |
|---|---|
| 0-3 | Response Time (0-15 msec) |
| 4-7 | Response Time (0-0.1 msec) |

However, the scope of the present invention is not restricted to the fact that the data size of the storage area of the storage section 310 in which glasses information is stored is four bytes, or to the order in which individual items of glasses information are stored, as indicated in Table 1, or to the formats for representing the chromaticity point, the transmittance, and the opening response time, as indicated in Table 2 through Table 4, respectively.

Figure 6:
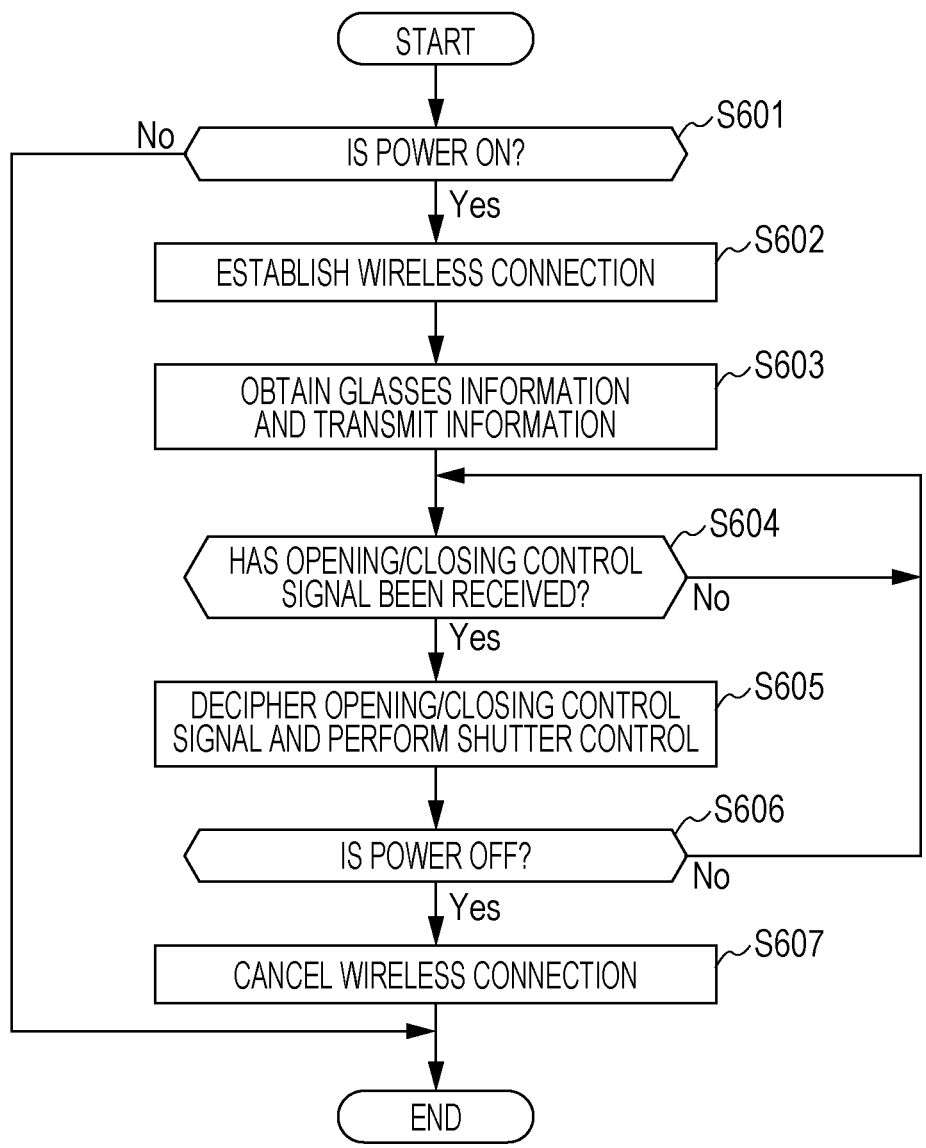
FIG. 6 is a flowchart illustrating a procedure for sending glasses information to the display apparatus 11 by shutter glasses 13.

FIG. 6 illustrates, in the form of a flowchart, a procedure for sending glasses information from the shutter glasses 13 to the display apparatus 11 in the image display system shown in FIG. 1A or 1B. This procedure is implemented by, for example, executing a predetermined program code by the control section 306.

First, it is checked whether the power of the shutter glasses 13 is ON (step S601). Here, if the power is not ON (No in step S601), this processing routine is ended.

On the other hand, if the power of the shutter glasses 13 is ON (Yes in step S601), wireless connection with the communication section 203 of the display apparatus 11 is established (step S602).

Then, the control section 306 reads glasses information from the storage section 310 and transmits the glasses information to the display apparatus 11 via the communication section 305 (step S603).

Then, it is checked whether the communication section 305 has received an opening control signal that instructs timings at which the shutters are opened and closed from the communication section 203 of the display apparatus 11 (step S604). Here, if an opening control signal has not been received (No in step S604), it is repeatedly checked whether an opening control signal has been received.

If an opening control signal has been received (Yes in step S604), the control section 306 deciphers the opening control signal so as to determine the times at which each of the left and right shutter lenses 308 and 309 is opened and closed. Based on the determination result, the control section 306 controls the opening and closing operation of each of the left and right shutter lenses 308 and 309 through the use of the shutter drive circuit 307 (step S605).

Then, it is checked whether the power of the shutter glasses 11 is turned OFF (step S606). If the power remains ON (No in step S606), it is repeatedly checked whether an opening control signal has been received.

On the other hand, if the power of the shutter glasses 11 is turned OFF (Yes in step S606), wireless connection with the communication section 203 of the display apparatus 11 is canceled (step S607), and this processing routine is ended.

Figure 7:
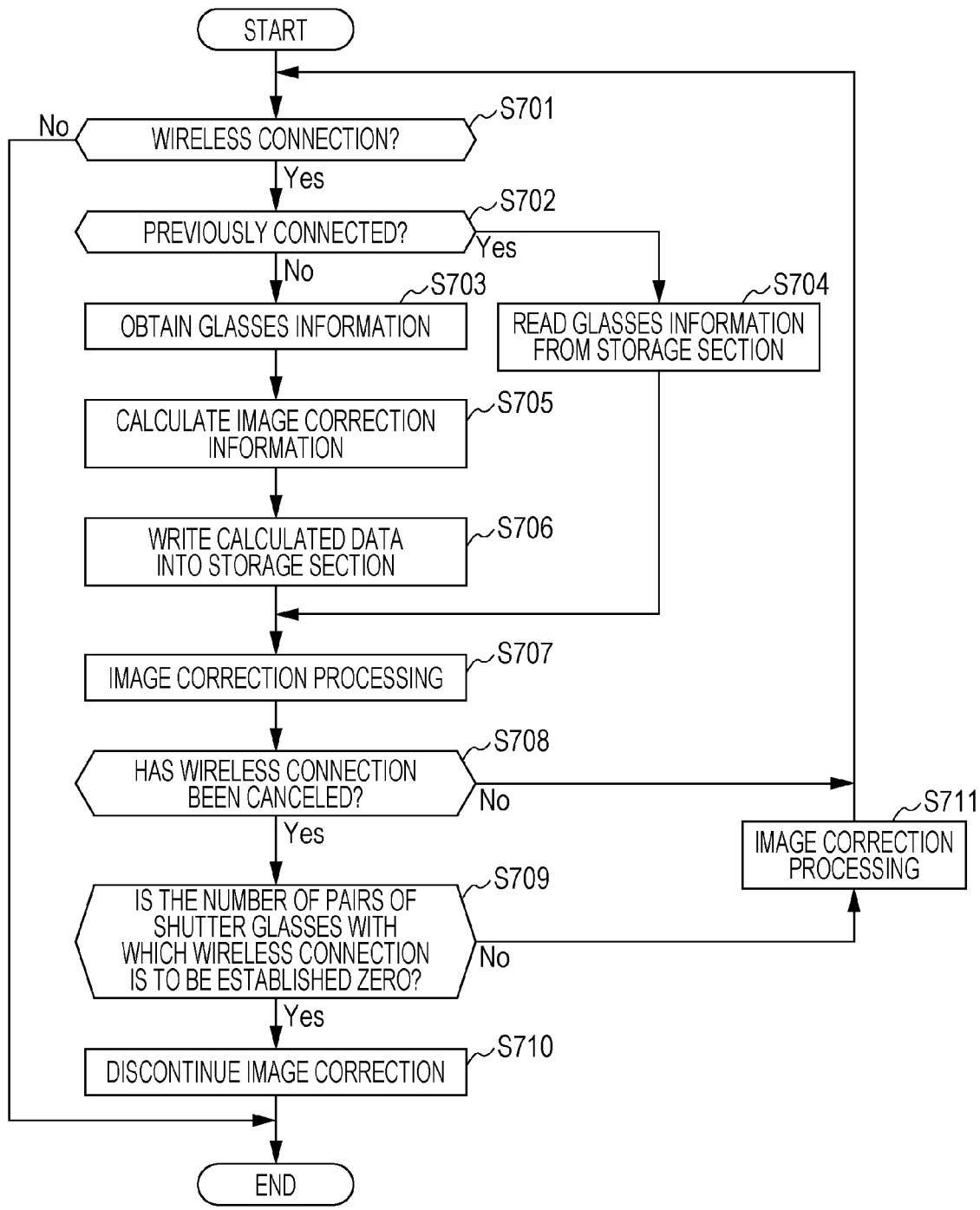
FIG. 7 is a flowchart illustrating a procedure for receiving glasses information from the shutter glasses 13 by the display apparatus 11 and also for performing, by the display apparatus 11, image correction for a display panel 210 on the basis of the glasses information.

Moreover, FIG. 7 illustrates, in the form of a flowchart, a procedure for receiving glasses information from the shutter glasses 13 by the display apparatus 11 and for performing image correction for the display panel 210 on the basis of the glasses information by the display apparatus 11 in the image display system shown in FIG. 1A or 1B. This procedure can be implemented by, for example, executing a predetermined program code by the CPU 219.

First, it is checked whether wireless communication with the shutter glasses 11 has been established (step S701). If connection has not been found (No in step S701), this processing routine is ended.

If wireless connection with the shutter glasses 13 has been detected (Yes in step S701), it is checked whether the detected shutter glasses are shutter glasses which were connected before (step S702).

If wireless connection has been established, a determination regarding whether the detected shutter glasses are shutter glasses which were connected before can be made on the basis of an MAC (Media Access Control) address described in a packet received from the communication section 305 of the shutter glasses 13 or another item of information that can be uniquely identified.

If the detected shutter glasses are shutter glasses which were connected before (Yes in step S702), it means that image correction information and timing adjustment information calculated from the glasses information have already been stored in a storage section, such as in the flash ROM 220. Accordingly, instead of obtaining glasses information from the connected shutter glasses 13 again, the corresponding image correction information (optimally corrected chromaticity point) and timing adjustment information are read from the flash ROM 220 (step S704), and the process proceeds to step S707.

On the other hand, if the detected shutter glasses are shutter glasses which are connected for the first time (No in step S702), a request for glasses information is made to the shutter glasses 13 via the communication section 203 and glasses information is obtained (step S703). Then, on the basis of the obtained glasses information, an optimally corrected image value and an optimal opening/closing control timing value are calculated (step S705). The obtained image correction information and opening/closing control timing information are stored in the flash ROM 220 in association with identification information (MAC address assigned to the communication section 305, etc.) of the shutter glasses 13 (step S706).

Then, by using the calculated image correction information and opening/closing control timing information or by using the image correction information and opening/closing control timing information read from the flash ROM 220, image correction processing and shutter glasses opening/closing timing adjustment is performed (step S707).

For example, if glasses information concerns the chromaticity point, in step S705, the optimally corrected chromaticity point is calculated. Also, in step S707, by using the corrected chromaticity data, signal processing or adjustment of chromaticity of backlight is performed.

Then, it is checked whether there is any pair of shutter glasses with which wireless connection has been canceled (step S708).

If wireless connection has not been canceled (No in step S708), it is determined that the pair of shutter glasses used for viewing images has not been changed, and the process returns to step S701. It is then checked whether wireless connection with another pair of shutter glasses has been established.

If there is a pair of glass shutters with which wireless connection has been canceled (Yes in step S708), it is further checked whether there is no pair of shutter glasses with which wireless connection is to be established (step S709).

If the number of pairs of shutter glasses with which wireless connection is to be established is not zero (No in step S709), image correction processing, such as the chromaticity correction, and the shutter opening/closing control timing processing are performed again (step S711) in accordance with the fact that the number of pairs of shutter glasses is reduced. Then, the process returns to step S701 in which it is checked whether wireless connection with another pair of shutter glasses has been established.

Also, if there is no pair of shutter glasses with which wireless connection is to be established (Yes in step S709), image correction processing and shutter opening/closing control timing processing are discontinued so that the chromaticity is returned to the normal chromaticity (step S710). This processing routine is ended.

Figure 8A:
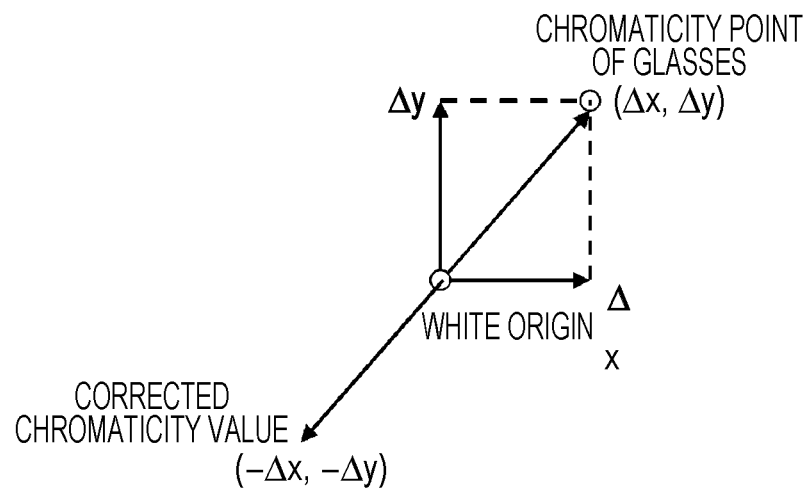
FIG. 8A is a view conceptually illustrating calculation for chromaticity correction when one pair of shutter glasses is being used for viewing images.

FIG. 8 conceptually illustrates calculation for chromaticity correction. If one pair of shutter glasses is being used for viewing images, as shown in FIG. 8A, the chromaticity point $(-\Delta x, -\Delta y)$, which is the inverse vector of the relative value $(\Delta x, \Delta y)$ of the chromaticity point of the pair of shutter glasses, is used as the corrected value.

Figure 8B:
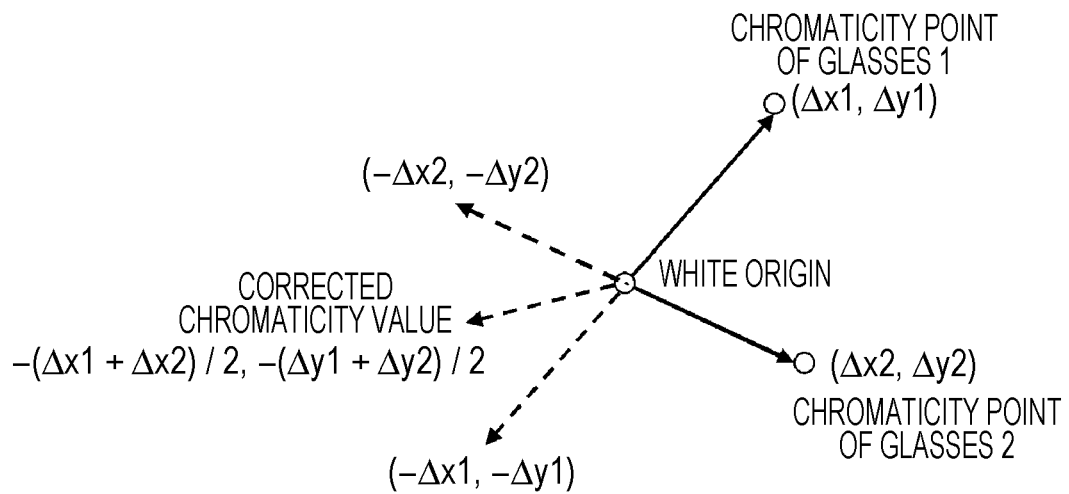
FIG. 8B is a view conceptually illustrating calculation for chromaticity correction when two pairs of shutter glasses are being used for viewing images.

If a plurality of pairs of shutter glasses are being used for viewing images, the average value of the relative values on each of the X axis and the Y axis of the chromaticity points of the individual pairs of shutter glasses is found, and the chromaticity point, which is the inverse vector of the average value is used as the corrected value. FIG. 8B conceptually illustrates calculation for chromaticity correction when two pairs of shutter glasses are being used for viewing images. If the relative value of the chromaticity point of the shutter glasses 1 is $(\Delta x_1, \Delta y_1)$ and if the relative value of the chromaticity point of the shutter glasses 2 is $(\Delta x_2, \Delta y_2)$, the average values of the relative values on the X axis and the Y axis of the chromaticity points of the individual shutter glasses are $((\Delta x_1+\Delta x_2)/2, (\Delta y_1+\Delta y_2)/2)$, respectively. Thus, the chromaticity point $(-(\Delta x_1+\Delta x_2)/2, -(\Delta y_1+\Delta y_2)/2)$, which is the inverse vector of the above-described average values, is used as the corrected value.

In FIG. 7, processing for the chromaticity point has been primarily discussed. However, when handling the transmittance data or shutter opening/closing control timing data as glasses information, the display apparatus 11 is able to implement the optimal luminance or shutter opening/closing control timing adjustment according to a procedure similar to that described above.

When viewing three-dimensional images for long hours, there may be some influence on human bodies caused by viewing extremely bright images. The purpose of the adjustment for the luminance is to minimize the adverse influence on human bodies. The adjustment for the luminance is performed by reducing the luminance of the display panel 210 in accordance with the highest transmittance value among the transmittance values of the shutter glasses that are used for viewing images.

In step S706 of the procedure shown in FIG. 7, upon calculation of image correction information, such as the corrected chromaticity value or the reduced luminance value, or shutter opening/closing control timing information, such as the shutter opening/closing control timing value, on the basis of glasses information obtained from the shutter glasses 13, the display apparatus 11 stores the calculation result in a storage section, such as in the flash ROM 220, in association with identification information (MAC address assigned to the communication section 305, etc.) of the shutter glasses 13. If there are a plurality of pairs of shutter glasses that are being used for viewing images, image correction information and the shutter opening/closing control timing value are calculated for each of the combinations of pairs of shutter glasses. Then, the calculated image correction information and shutter opening/closing control timing value are stored in association with identification information for identifying a combination of pairs of shutter glasses. If a combination of a plurality of pairs of shutter glasses is used, the corrected chromaticity value is the inverse vector of the averages of the relative values of the chromaticity points of the individual pairs of shutter glasses (see FIG. 8B), the reduced luminance value is a value of a pair of the shutter glasses having the highest transmittance, and the shutter opening response time is the average value of the opening response times of the individual pairs of shutter glasses.

Table 5 indicates an example of addressing of image correction information and shutter opening/closing control timing information in a storage area of a storage section, such as in the flash ROM 220, of the display apparatus 11. (6×M+4) bytes are assigned, for each combination of pairs of shutter glasses, to the addresses of the storage area. In the first 6×M bytes, identification information concerning a combination of pairs of shutter glasses is stored. As identification information concerning each of the pairs of shutter glasses, an MAC address assigned to the communication section 305 may be used, and the MAC address of each pair of shutter glasses is stored in the 6×M bytes. In the following two bytes, information concerning the corrected chromaticity point for the corresponding combination of pairs of shutter glasses is stored. In the following one byte, information concerning the reduced luminance value is stored. In the final one byte, information concerning the shutter opening/closing control timing value is stored.

TABLE 5

| Memory Address | Data Description |
|---|---|
| — | Other Information |
| N | Mac Address or Combination Number 1 |
| N + 6 × (m − 1) + 5 | Corrected Chromaticity Value 1 |
| N + 6 × (m − 1) + 7 | Corrected Luminance Value 1 |
| N + 6 × (m − 1) + 8 | Shutter Opening/Closing Control Timing Value 1 |
| N + 6 × (m − 1) + 9 | Mac Address or Combination Number 2 |
| N + 6 × (p − 1) + 15 | Corrected Chromaticity Value 2 |
| N + 6 × (p − 1) + 17 | Corrected Luminance Value 2 |
| N + 6 × (p − 1) + 18 | Shutter Opening/Closing Control Timing Value 2 |
| — | Other Information |

In accordance with the number of pairs of shutter glasses to be combined (i.e., the number of pairs of shutter glasses that are simultaneously used for viewing three-dimensional images), a 6×M-byte length is necessary for storing identification information. Accordingly, when wireless connection has been established with shutter glasses by using the communication section 203, identification information, such as a combination number, for identifying a combination of pairs of shutter glasses, is assigned, thereby making it possible to reduce a data area for storing combinations of pairs of shutter glasses. An example of addressing of image correction information in the storage area in this case is shown in Table 6. (6×M+4) bytes are assigned, for each combination of pairs of shutter glasses, to the addresses of the storage area. In the first one byte, the combination number of shutter glasses is stored. Then, in the following two bytes, information concerning the corrected chromaticity value for the combination of the shutter glasses is stored. In the following one byte, information concerning the reduced luminance value is stored. In the final one byte, information concerning the shutter opening/closing control timing value is stored (the same as above).

TABLE 6

| Memory Address | Data Description |
|---|---|
| — | Other Information |
| N | Combination Number 1 |
| N + 1 | Corrected Chromaticity Value 1 |
| N + 3 | Corrected Luminance Value 1 |
| N + 4 | Shutter Opening/Closing Control Timing Value 1 |
| N + 5 | Mac Address or Combination Number 2 |
| N + 6 | Corrected Chromaticity Value 2 |
| N + 8 | Corrected Luminance Value 2 |
| N + 9 | Shutter Opening/Closing Control Timing Value 2 |
| — | Other Information |

Table 7 indicates an example of representation of the corrected chromaticity value using two bytes. The corrected chromaticity value is the inverse vector of the average of the relative values of the chromaticity points of individual pairs of shutter glasses (as stated above), and is represented by the relative value ($\Delta x$, $\Delta y$) with respect to the reference chromaticity point. Accordingly, one byte is assigned to each of the X axis and the Y axis: the first one bit of one byte is assigned to sign information, and the color difference $\Delta x$ or $\Delta y$ on the X axis or Y axis is represented by the remaining seven bits.

TABLE 7

| Bit | Function |
|---|---|
| 0 | Axis X data Sign (0:plus, 1:minus) |
| 1-7 | Axis $\Delta X$ |
| 8 | Axis Y data Sign (0:plus, 1:minus) |
| 9-15 | Axis $\Delta Y$ |

Table 8 indicates an example of representation of the reduced luminance value using one byte. The reduced luminance value is a value of a pair of shutter glasses having the highest transmittance (the same as above). The reduced luminance value is also represented by a relative value (A/B), and is represented by using one byte in the form of the percentage (A/B×100). Although data having numbers after decimal points is not represented in the same table, such data may be represented by making extensions, such as by increasing the number of bytes, if necessary.

TABLE 8

| Bit | Function |
|---|---|
| 0-7 | Degradation ratio (0-64%) |

Table 9 indicates an example of representation of the shutter opening response time using one byte. The shutter opening response time is represented by the average value of the opening response times of individual pairs of shutter glasses (the same above), and is represented by using one byte in the form of milliseconds. Although data having numbers in the second and subsequent decimal places is not represented in the same table, such data may be represented by making extensions, such as by increasing the number of bytes, if necessary.

TABLE 9

| Bit | Function |
| --- | --- |
| 0-3 | Response Time (0-15msec) |
| 4-7 | Response Time (0-0.1msec) |

However, the scope of the present invention is not restricted to the data size for storing image correction information, the order in which individual items of image correction information or shutter opening/closing control timing information are stored, as indicated in Table 5 or 6, or to the format for representing the corrected chromaticity value, the reduced luminance value, and the shutter opening/closing control timing value, as indicated in Table 7 through Table 9, respectively.

So far, the following control method has been discussed. In this control method, when the single display apparatus 11 is simultaneously viewed by using a plurality of pairs of shutter glasses having different chromaticity points and transmittance values of the liquid crystal lenses, the inverse vector of the average of the relative values of the chromaticity points of the individual pairs of shutter glasses is used as the corrected chromaticity value (see FIG. 8B), and a value of a pair of shutter glasses having the highest transmittance is used as the reduced luminance value. According to this control method, by using the corrected chromaticity value and the reduced luminance value obtained through approximate calculation, the chromaticity difference and the luminance difference among the individual pairs of shutter glasses can be minimized. If the display apparatus 11 is able to perform fast frame display by the same number of pairs of shutter glasses used for simultaneously viewing the display apparatus 11, chromaticity correction for a corresponding pair of shutter glasses can be performed for each of continuous frames.

Figure 9:
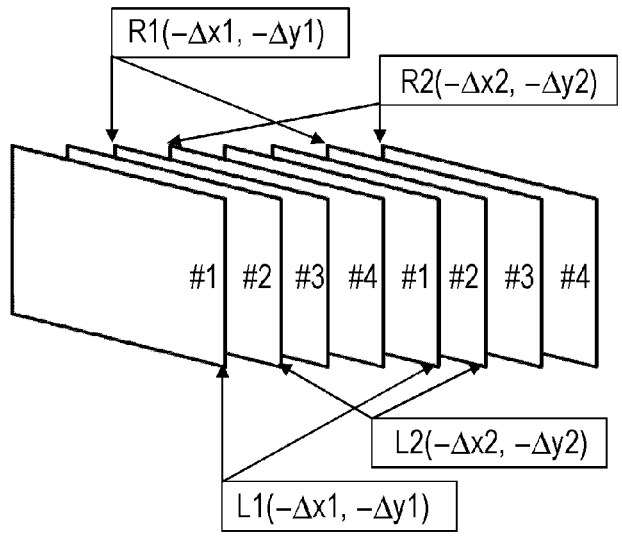
FIG. 9 is a view illustrating chromaticity correction for a corresponding pair of shutter glasses being performed for each of continuous frames.

FIG. 9 illustrates, when two pairs of shutter glasses are used for simultaneously viewing the display apparatus 11 by way of example, chromaticity correction for a corresponding pair of shutter glasses being performed for each of continuous frames. In the same drawing, frame #1 is a left-eye image L1 ($-\Delta x_1, -\Delta y_1$) obtained as a result of correcting the chromaticity of a first pair of shutter glasses, frame #2 is a left-eye image L2 ($-\Delta x_2, -\Delta_2$) obtained as a result of correcting the chromaticity of a second pair of shutter glasses, frame #1 is a right-eye image R1 ($-\Delta x_1, -\Delta y_1$) obtained as a result of correcting the chromaticity of the first pair of shutter glasses, frame #2 is a right-eye image R2 ($-\Delta x_2, \Delta y_2$) obtained as a result of correcting the chromaticity of the second pair of shutter glasses, and so on. Additionally, the display apparatus 11 sends an opening control signal for each pair of shutter glasses so that each pair of shutter glasses can perform a shutter opening/closing operation in accordance with the display period of each of a left-eye image and a right-eye image assigned to the corresponding pair of shutter glasses.

So far, as glasses information, information related to the difference among the shutter glasses 13 themselves, such as the chromaticity point and the luminance of the liquid crystal lenses, or the shutter opening response time when the shutters are opened, has been discussed. As the glasses information, instead of information concerning the shutter glasses 13 themselves, information concerning a viewer wearing the shutter glasses 13 may be treated. In this case, the display apparatus may perform display control on the basis of biological information concerning a viewer.

Glasses information concerning a viewer wearing the shutter glasses 13 includes biological information concerning a viewer wearing the shutter glasses 13. The shutter glasses 13 are provided with a biosensor so that biological information can be obtained from a viewer.

Figure 10:
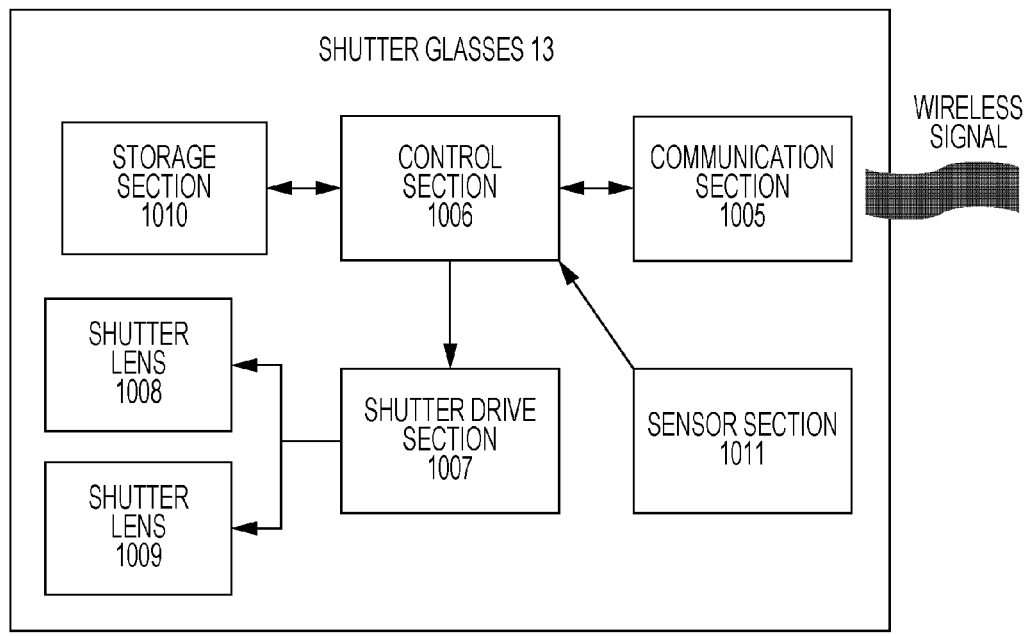
FIG. 10 is a diagram illustrating an example of the configuration of shutter glasses provided with a biosensor.

FIG. 10 illustrates an example of the configuration of the shutter glasses 13 provided with a biosensor. The shutter glasses 13 include a communication section 1005 that sends and receives wireless signals to and from the display apparatus 11 through radio communication, a control section 1006, a storage section 1010 that stores therein glasses information and other data, a left-eye shutter lens 1008 and a right-eye shutter lens 1009 which are each made of a liquid crystal material, a shutter drive circuit 1007, and a sensor section 1011.

A wireless signal sent from the display apparatus 11 to the shutter glasses 13 is, for example, an opening control signal that instructs timings at which left and right shutters of the shutter glasses are opened and closed. Upon receiving an opening control signal, the communication section 1005 inputs the signal into the control section 1006. The control section 1006 deciphers the opening control signal so as to determine timings at which the left and right shutters 1008 and 1009 are opened and closed. The control section 1006 controls, on the basis of the determination result, the opening and closing operation of the left and right shutter lenses 1008 and 1009 via the shutter drive circuit 1007. The control section 1006 also inputs and outputs data into and from the storage section 1010.

The sensor section 1011 is a biosensor that detects biological information from a viewer wearing the shutter glasses 13. The control section 1006 stores, as glasses information, the biological information detected by the sensor section 1011 in the storage section 1010. Moreover, in response to a request from the display apparatus 11, the control section 1006 reads biological information from the storage section 1010 and wirelessly sends the biological information to the display apparatus 11 via the communication section 1005.

The sensor section 1011 is a biosensor that measures, for example, brain waves. The types of brain waves are indicated in Table 10. Among the brain waves, by measuring β waves, the fatigue degree of a viewer can be detected. When viewing three-dimensional images for long hours, the fatigue of the eyes or brains increases, and the β waves are increased accordingly, thereby making it possible to determine that the fatigue degree of a viewer is intensified.

TABLE 10

| Type of Brain Waves | Frequency | Meaning |
| --- | --- | --- |
| δ(delta) waves | 1~3 Hz | Deep Sleep |
| θ(theta) waves | 4~7 Hz | Light Sleep |
| α(alpha) waves | 8~13 Hz | Rapidity |
| β(beta) waves | 14~30 Hz | Stressful Conditions, e.g., Strain and Anxiety |
| γ(gamma) waves | 31~64 Hz | |
| ω(omega) waves | 64~128 Hz | |
| ρ(rho) waves | 128~512 Hz | |
| σ(sigma) waves | 512~1024 Hz | |

Moreover, it is known that the intensity of β waves can be detected in a μV range.

The control section 1006 wirelessly sends biological information including a β-wave measurement result to the display apparatus 11 via the communication section 1005. For example, when the power of the shutter glasses 13 is ON, the control section 1006 regularly sends biological information.

The β-wave measurement result may be handled by a RAW data format in which data is expressed by the β-wave signal intensity itself and a comparison format in which data is expressed by comparing the signal intensity with a threshold. In the former RAW data format, the β-wave measurement result is expressed by a 12-bit data having a data structure, as indicated in, for example, Table 11. The upper 8 bits represent integers (0-255 µV), and the lower 4 bits represent decimal points (0.1-0.9 µV). Also, an example of the packet configuration for supplying β-wave measurement information expressed in the format shown in Table 11 to the display apparatus 11 is shown in Table 12.

TABLE 11

| Bit | Level |
|---|---|
| 0-7 | 0~255 µV |
| 8-11 | 0.1~0.9 µV |

TABLE 12

| Packet Byte No. | Data Description |
|---|---|
| 0 | Data Type Header (0 × 01) |
| 1-2 | β-wave Measurement Information |

In the latter comparison format, the control section 1006 compares the β-wave signal intensity with a predetermined threshold for determining the fatigue degree. Note that the threshold is set in advance in the shutter glasses 13. Then, when the signal intensity exceeds the threshold, the control section 1006 detects that the viewer's eyes or brain are tired, and only when an event has occurred, the control section 1006 informs the display apparatus 11 via the communication section 1005 that the viewer is tired. The β-wave intensity determination result can be represented by a flag, and can be informed to the display apparatus 11 by using, for example, a packet having the data structure shown in Table 13. The display apparatus 11 then displays a warning on the display panel 20.

TABLE 13

| Packet Byte No. | Data Description |
|---|---|
| 0 | Data Type Header (0 × 02) |
| 1 | β-wave Intensity Determination Result |

Figure 11:
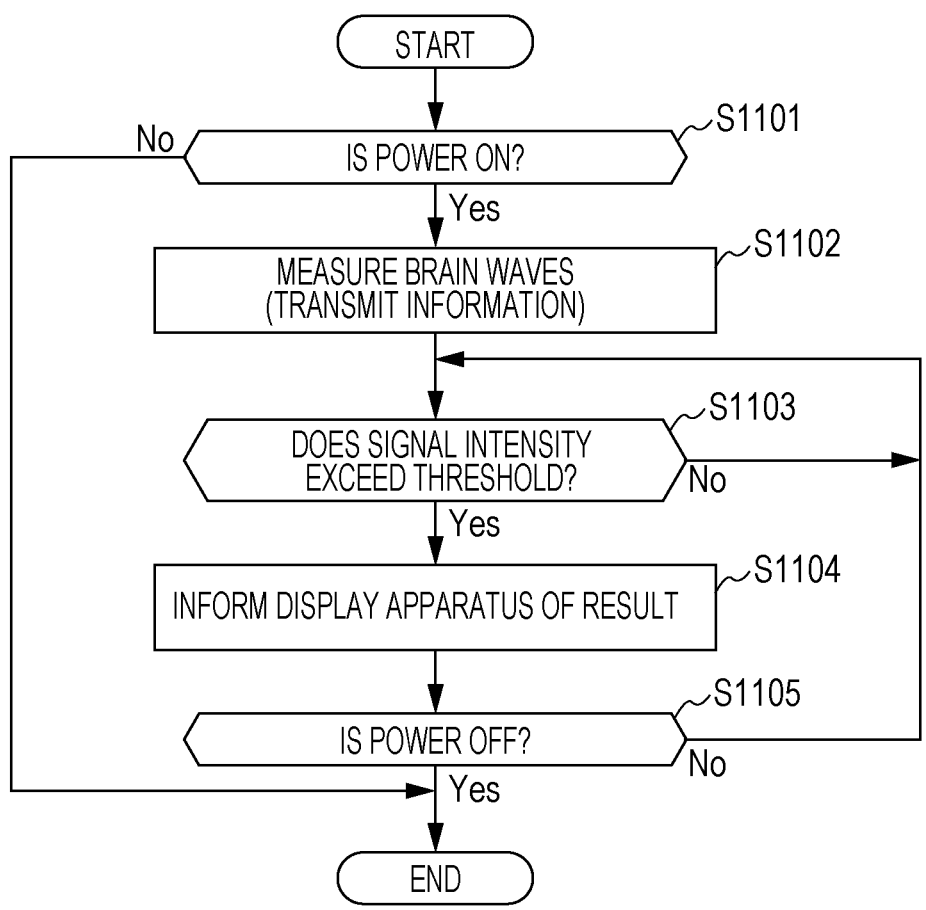
FIG. 11 is a flowchart illustrating a procedure for measuring viewer's brain waves and sending them to the display apparatus 11 by the shutter glasses 13.

FIG. 11 illustrates, in the form of a flowchart, a procedure for measuring viewer's brain waves and sending them to the display apparatus 11 by the shutter glasses 13 in the image display system shown in FIG. 1A or 1B. This procedure can be implemented by, for example, executing a predetermined program code by the control section 306.

First, it is checked whether the power of the shutter glasses 13 is ON (step S1101). If the power is not ON (No in step S1101), this processing routine is ended.

On the other hand, if the power of the shutter glasses 13 is ON (Yes in step S1101), it is determined that the shutter glasses 13 are being used and worn by a viewer, and the sensor section 1101 measures β waves (step S1102).

If a comparison format using a threshold is not employed, the data measured in step S1102 in the form of a packet having a data structure shown in Table 11 is wirelessly sent to the display apparatus 11. If a comparison format using a threshold is employed, the data measured in step S1102 is compared with a threshold for determining the fatigue degree (step S1103). Then, if the measured data exceeds a threshold (Yes in step S1103), a β-wave intensity determination result represented by a flag in the form of a packet (see Table 12) is wirelessly sent to the display apparatus 11 (step S1104).

Then, it is checked whether the power of the shutter glasses 13 is turned OFF (step S1105). If the power remains ON (No in step S1105), it is determined that the viewer is still using the shutter glasses 13, and the process returns to step S1102. Then, measurements of β waves and wireless transmission to the display apparatus 11 are repeatedly performed.

On the other hand, if the power of the shutter glasses 13 is turned OFF (Yes in step S1105), it is determined that the viewer has finished using the shutter glasses 13, and this processing routine is ended.

Figure 12:
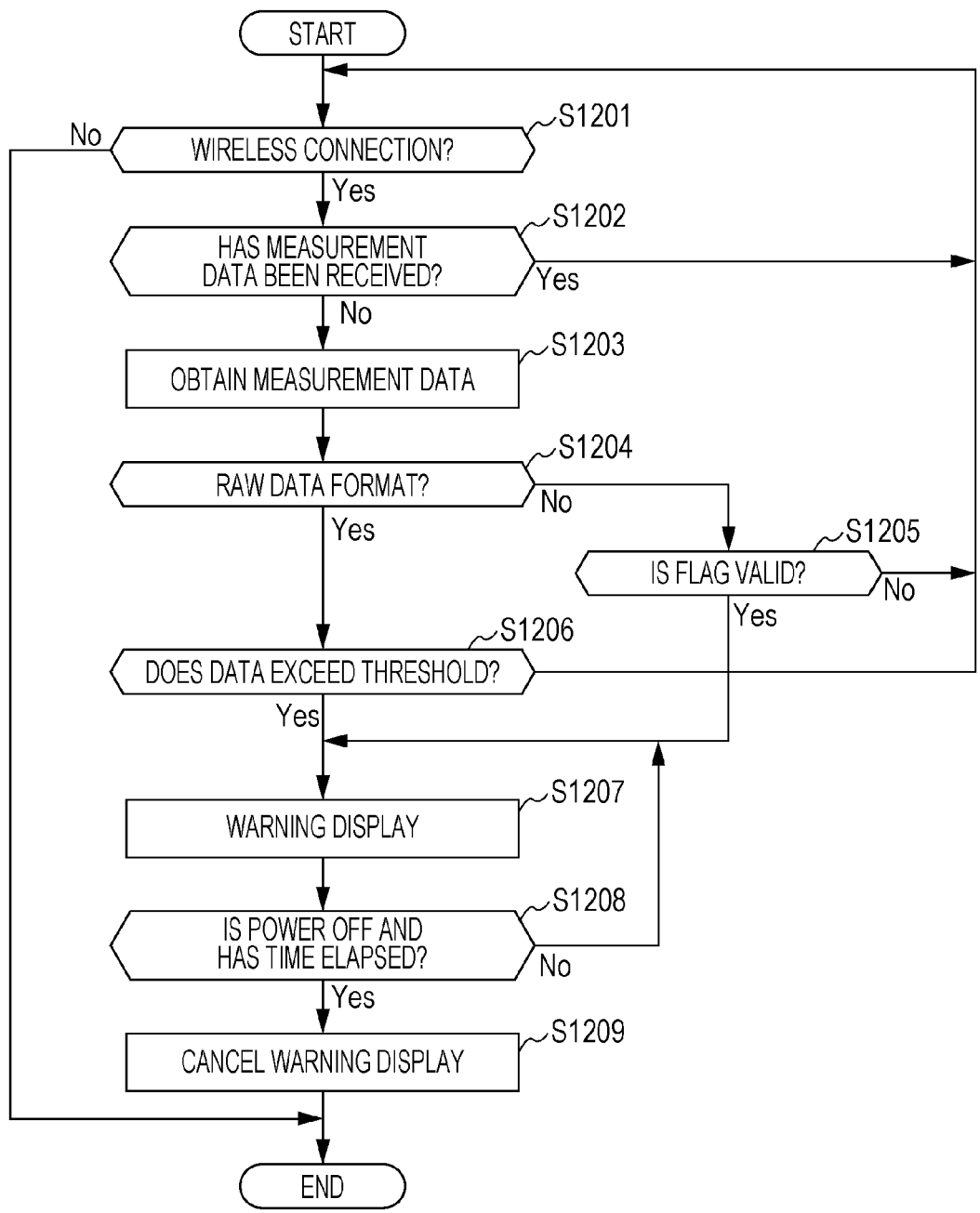
FIG. 12 is a flowchart illustrating a procedure for receiving biological information from the shutter glasses 13 by the display apparatus 11 and also for displaying a warning on the basis of the biological information by the display apparatus 11.

Moreover, FIG. 12 illustrates, in the form of a flowchart, a procedure for receiving biological information from the shutter glasses 13 by the display apparatus 11 and displays a warning on the basis of the biological information by the display apparatus 11 in the image display system shown in FIG. 1A or 1B. This procedure can be implemented by, for example, executing a predetermined program code by the CPU 219.

First, in step S1201, it is checked whether wireless connection with the shutter glasses 13 has been established (step S1201). If connection has not been detected (No in step S1201), this processing routine is ended.

If wireless connection with the shutter glasses 13 has been detected (Yes in step S1201), an attempt is made to receive a packet describing a brain-wave measurement result from the shutter glasses 13 (step S1202). Then, if the reception of a packet has failed (step No in step S1202), a reception determination step in step S1202 is repeated.

If the reception of a packet describing a brain-wave measurement result from the shutter glasses 13 has succeeded (Yes in step S1202), information concerning the brain-wave measurement result is extracted from the received packet and is stored in a storage section, such as in the flash ROM 220 (step S1203).

Then, the data type header is checked to determine the data format of the received brain-wave measurement result. If the data format is RAW data (Yes in step S1204), the data is compared with a predetermined threshold for determining the fatigue degree (step S1206). If the data does not exceed the threshold (No in step S1206), it is determined that the viewer's fatigue degree is low, and the process returns to step S1202. The reception of a packet describing a brain-wave measurement result from the shutter glasses 13 is repeatedly performed. If the data exceeds the threshold (Yes in step S1206), it can be detected that the viewer's eyes or brain are tired.

If the data format is not RAW data (No in step S1204), it is checked whether the flag is valid (step S1205). If the flag is not valid (No in step S1205), it is determined that the viewer's fatigue is low, and the process proceeds to step S1202. The reception of a packet describing a brain-wave measurement result from the shutter glasses 13 is repeatedly performed. If the flag is valid (Yes in step S1205), it is detected that the viewer's eyes or brain are tired.

If it is determined in step S1205 or S1206 that the viewer's eyes or brain are tired, a warning message to suggest that the viewer stop viewing three-dimensional images (because the viewer is tired) is generated in the graphic generating circuit 208 and is displayed on the display panel 210 (step S1207).

Thereafter, it is checked whether a predetermined period has elapsed after the power of the shutter glasses 13 was turned OFF (step S1208).

If a predetermined period has not elapsed after the power of the shutter glasses 13 was turned OFF (No in step S1208), it is determined that the viewer's fatigue has not been recovered, and the process returns to step S1207 in which warning display is continuously performed.

If a predetermined period has elapsed after the power of the shutter glasses 13 was turned OFF (Yes in step S1208), it is determined that the viewer's fatigue degree has decreased or the fatigue has been recovered, warning display is canceled (step S1209), and this processing routine is ended.

Instead of obtaining information concerning a viewer's brain wave signal from the shutter glasses 13, the display apparatus 11 can perform warning display by estimating whether the viewer is tired or not on the basis of the continuous viewing time. In contrast, if information concerning a viewer's brain wave signal is obtained from the shutter glasses 13 as described above, warning display can be performed appropriately at a timing when the viewer is actually tired.

Industrial Applicability

The present invention has been described in detail while referring to the specific embodiment. It is apparent, however, that modifications or alternatives to the embodiment can be made by those skilled in the art without departing from the scope of the present invention.

In the embodiment described in the present specification, shutter glasses store therein glasses information, and the display apparatus stores therein image correction information and shutter opening/closing control timing information, which are the result of performing calculation from glasses information sent from the shutter glasses. However, the scope of the present invention is not restricted to this. The shutter glasses may store therein image correction information and shutter opening/closing control timing information, and the display apparatus may perform image correction processing for three-dimensional images and shutter opening/closing control timing processing on the basis of the image correction information sent from the shutter glasses (without performing calculation from glasses information).

Moreover, in the present specification, as glasses information, the chromaticity point and the transmittance of liquid crystal lenses used for a pair of shutter glasses, the shutter opening response time, and biological information obtained from a viewer wearing the shutter glasses, are used. However, the scope of the present invention is not restricted to those.

That is, the present invention has been disclosed by way of examples, and the disclosure in this specification should not be construed as limiting. The scope of the present invention should be determined on the basis of the section of claims.

Reference Signs List

11 . . . display apparatus
12 . . . communication section
13 . . . shutter glasses
203 . . . communication section
204 . . . antenna
205 . . . tuner circuit
206 . . . MPEG decoder
207 . . . image signal processing circuit
208 . . . graphic generating circuit
209 . . . panel drive circuit
210 . . . display panel
211 . . . audio signal processing circuit
212 . . . audio amplifier circuit
213 . . . speaker
214 . . . HDMI terminal
215 . . . HDMI receiving circuit
216 . . . communication processing circuit
217 . . . network terminal
218 . . . internal bus
219 . . . CPU
220 . . . flash ROM
221 . . . DRAM
222 . . . remote control receiving section
223 . . . remote controller
305 . . . communication section
306 . . . control section
307 . . . shutter drive circuit
308 . . . left-eye shutter
309 . . . right-eye shutter
310 . . . storage section
1005 . . . communication section
1006 . . . control section
1007 . . . shutter drive circuit
1008 . . . left-eye shutter
1009 . . . right-eye shutter
1010 . . . storage section
1011 . . . sensor section

The invention claimed is:

1. An image display system comprising:
shutter glasses including shutter lenses, a storage section storing therein at least glasses information, and a communication section; and
a display apparatus including a display section that displays images and a communication section,
wherein:
the shutter glasses perform an operation for opening and closing the shutter lenses in synchronization with switching of images of the display section of the display apparatus, and also send the glasses information to the display apparatus via the communication section; and
the display apparatus controls the display section on the basis of the received glasses information,
wherein the glasses information is sent to the display apparatus upon the glasses being powered on or upon request by the display apparatus, wherein when receiving, as the glasses information, information concerning a chromaticity point of shutter lenses from each of a plurality of pairs of shutter glasses, the display apparatus performs chromaticity correction for a display image signal of the display section on the basis of an average value of the chromaticity points of the individual pairs of shutter glasses.

2. The image display system according to claim 1, wherein:
the shutter glasses store, as the glasses information, information concerning characteristics of the shutter lenses in the storage section, and also send the information to the display apparatus via the communication section; and
the display apparatus performs image correction for a display image signal of the display section on the basis of the information concerning the characteristics of the shutter lenses received as the glasses information.

3. The image display system according to claim 1, wherein:
the shutter glasses store, as the glasses information, information concerning the chromaticity point of the shutter lenses in the storage section, and also send the information to the display apparatus via the communication section; and
the display apparatus performs the chromaticity correction for the display image signal of the display section on the basis of the information concerning the chromaticity point of the shutter lenses received as the glasses information.

4. The image display system according to claim 1, wherein:
the shutter glasses store, as the glasses information, information concerning an opening response time of the shutter lenses in the storage section, and also send the information to the display apparatus via the communication section; and
the display apparatus performs timing correction for an opening control signal for the shutter lenses generated by an image signal processing circuit of the display apparatus, on the basis of the information concerning the opening response time received as the glasses information.

5. The image display system according to claim 1, wherein, when receiving, as the glasses information, information concerning an opening response time from each of the plurality of pairs of shutter glasses, the display apparatus performs timing correction for an opening control signal for the shutter lenses generated by the display section, on the basis of an average value of the opening response times of the individual pairs of shutter glasses.

6. The image display system according to claim 1, wherein, when receiving the glasses information from the plurality of pairs of shutter glasses, the display apparatus performs image correction for each of continuous frames in accordance with the glasses information of the corresponding pair of shutter glasses, and also causes the corresponding pair of shutter glasses to control opening and closing of the shutter lenses in accordance with a display period of a frame assigned to the corresponding pair of shutter glasses.

7. The image display system according to claim 1, wherein:
the shutter glasses send, as the glasses information, biological information concerning a viewer wearing the shutter glasses to the display apparatus via the communication section; and
the display apparatus displays a display content suitable for the received biological information on the display section.

8. The image display system according to claim 1, wherein:
the shutter glasses store, as the glasses information, information concerning a transmittance of the shutter lenses in the storage section, and also send the information to the display apparatus via the communication section; and
the display apparatus adjusts a luminance for the display image signal of the display section on the basis of the information concerning the transmittance received as the glasses information.

9. The image display system according to claim 8, wherein, when receiving, as the glasses information, information concerning the transmittance from each of the plurality of pairs of shutter glasses, the display apparatus reduces the luminance for the display image signal of the display section on the basis of the highest transmittance.

10. A wearing unit for viewing a plurality of images comprising:
a plurality of lenses;
a drive section that performs an operation for viewing the plurality of images;
a communication section that performs communication with a display apparatus that switches images;
a storage section that stores therein at least wearing unit information,
wherein the wearing unit performs control, on the basis of a control signal received from the display apparatus by the communication section, so that the drive section performs the operation for viewing the plurality of images, and also reads the wearing unit information from the storage section and sends the wearing unit information to the display apparatus via the communication section; and
a sensor section that detects a brain wave signal of a viewer as biological information concerning the viewer wearing the wearing unit, wherein the wearing unit sends the wearing unit information concerning a fatigue degree of the viewer, wherein the fatigue degree is determined as a measurement result of comparing intensity of a beta wave signal of the brain wave signal with a predetermined threshold, to the display apparatus via the communication section, wherein the wearing unit information is sent to the display apparatus upon the wearing unit being powered on or upon request by the display apparatus,
wherein a warning signal is displayed on the display apparatus based on the measurement result determined by the sensor section, and
wherein the warning signal continues to display on the display apparatus until a predetermined time period has elapsed after power of the wearing unit is turned off.

11. The wearing unit according to claim 10, wherein:
the storage section stores a chromaticity point, a transmittance, or a response time of the plurality of lenses, or other wearing unit information unique to the wearing unit; and
the wearing unit reads the wearing unit information from the storage section and sends the wearing unit information to the display apparatus via the communication section.

12. A display apparatus comprising:
a display section that displays images;
an image signal processing section that processes an image signal displayed on the display section; and
a communication section that performs bi-directional communication with a wearing unit associated with a viewer viewing the images displayed on the display section,
wherein the display apparatus sends, via the communication section, a control signal for allowing the wearing unit to perform an operation for viewing the images on the display section, and also controls the display section on the basis of wearing unit information received from the wearing unit by the communication section,
wherein the wearing unit information is sent to the display apparatus upon the wearing unit being powered on or upon request by the display apparatus, wherein the display apparatus receives, from the wearing unit, the wearing unit information concerning a fatigue degree of the viewer, wherein the fatigue degree is determined as a measurement result of comparing intensity of a beta wave signal of a brain wave signal with a predetermined threshold,
wherein a warning signal is displayed on the display apparatus based on the determined measurement result, and
wherein the warning signal continues to display on the display apparatus until a predetermined time period has elapsed after power of the wearing unit is turned off.

13. The display apparatus according to claim 12, wherein, when receiving the wearing unit information from a plurality of wearing units, the display apparatus performs image correction for each of continuous frames in accordance with the wearing unit information of the corresponding wearing unit, and also sends, via the communication section, the control signal, for the corresponding wearing unit, for controlling a plurality of lenses of the corresponding wearing unit in accordance with a display period of a frame assigned to the corresponding wearing unit.

14. The display apparatus according to claim 12, wherein:
the display apparatus displays a warning on the display section in accordance with the fatigue degree of the viewer based on the received wearing unit information.

15. The display apparatus according to claim 12, wherein:
the display apparatus receives wearing unit information concerning characteristics of a plurality of lenses of the wearing unit from the wearing unit; and
the display apparatus performs image correction for a display image signal of the display section on the basis of the information concerning the characteristics of the plurality of lenses.

16. The display apparatus according to claim 15, wherein:
the display apparatus receives wearing unit information concerning a chromaticity point of the plurality of lenses from the wearing unit; and the display apparatus performs chromaticity correction for the display image signal of the display section on the basis of the information concerning the chromaticity point.

17. The display apparatus according to claim 16, wherein when receiving the wearing unit information concerning the chromaticity point of the plurality of lenses from each of a plurality of wearing units, the display apparatus performs chromaticity correction for the display image signal of the display section on the basis of an average value of the chromaticity points of the individual wearing units.

18. The display apparatus according to claim 15, wherein:
the display apparatus receives wearing unit information concerning a transmittance of the plurality of lenses from the wearing unit; and
the display apparatus adjusts a luminance for the display image signal of the display section on the basis of the information concerning the transmittance.

19. The display apparatus according to claim 18, wherein when receiving wearing unit information concerning the transmittance of the plurality of lenses from each of a plurality of wearing units, the display apparatus reduces the luminance for the display image signal of the display section on the basis of the highest transmittance.

20. The display apparatus according to claim 15, wherein:
the display apparatus receives wearing unit information concerning a response time of the plurality of lenses from the wearing unit; and
the display apparatus performs timing correction for the control signal for the wearing unit on the basis of the information concerning the response time.

21. The display apparatus according to claim 20, wherein when receiving wearing unit information concerning the response time of the plurality of lenses from each of a plurality of wearing units, the display apparatus performs timing correction for the control signal for the plurality of lenses on the basis of an average value of the response time of the individual wearing units.

* * * * *